(12) United States Patent
Ko

(10) Patent No.: US 7,839,846 B2
(45) Date of Patent: Nov. 23, 2010

(54) CALL TRACKING SYSTEMS

(75) Inventor: Yiu Fai Ko, London (GB)

(73) Assignee: Actix Limited (GB)

( * ) Notice: Subject to any disclaimer, the term of this patent is extended or adjusted under 35 U.S.C. 154(b) by 657 days.

(21) Appl. No.: 11/396,260

(22) Filed: Mar. 30, 2006

(65) Prior Publication Data

US 2006/0227754 A1    Oct. 12, 2006

Related U.S. Application Data

(63) Continuation of application No. PCT/GB2004/050006, filed on Sep. 13, 2004.

(60) Provisional application No. 60/574,635, filed on May 26, 2004.

(30) Foreign Application Priority Data

Oct. 1, 2003  (GB)  .................................. 0322979.6

(51) Int. Cl.
*H04L 12/28* (2006.01)
*H04L 12/56* (2006.01)

(52) U.S. Cl. ..................................................... 370/389

(58) Field of Classification Search ......... 370/351–356, 370/389, 471, 474, 493, 496
See application file for complete search history.

(56) References Cited

U.S. PATENT DOCUMENTS 6,594,246 B1 * 7/2003 Jorgensen ................... 370/338
2001/0053145 A1 * 12/2001 Willars et al. ............... 370/352
2002/0120749 A1 * 8/2002 Widegren et al. ........... 709/227
2003/0100299 A1   5/2003 Ko et al.
2004/0218569 A1 * 11/2004 Pedersen et al. ............ 370/334

FOREIGN PATENT DOCUMENTS

EP    0805609 A2    11/1997
EP    1303102 A2    4/2003

OTHER PUBLICATIONS

"International Application Serial No. PCT/GB2004/050006, International Search Report mailed Dec. 17, 2004", 3 pgs.
"International Application Serial No. PCT/GB2004/050006, Written Opinion mailed Dec. 17, 2004", 8 pgs.

* cited by examiner

*Primary Examiner*—Chirag G Shah
*Assistant Examiner*—Minh-Trang Nguyen
(74) *Attorney, Agent, or Firm*—Schwegman, Lundberg & Woessner, P.A.

(57) ABSTRACT

Embodiments of the invention relate to the identification of messages relating to a particular communications session from a stream of messages, and more particularly to tracking voice and/or data call messages in packet data networks such as a UMTS mobile phone network. Various embodiments include a method of identifying messages associated with a communications session in a stream of messages captured from an interface within a network, the network including a fixed station in wireless communications with a plurality of mobile stations, said communications session being associated with one of said mobile stations and said stream of messages including messages for a plurality of communications sessions.

17 Claims, 23 Drawing Sheets

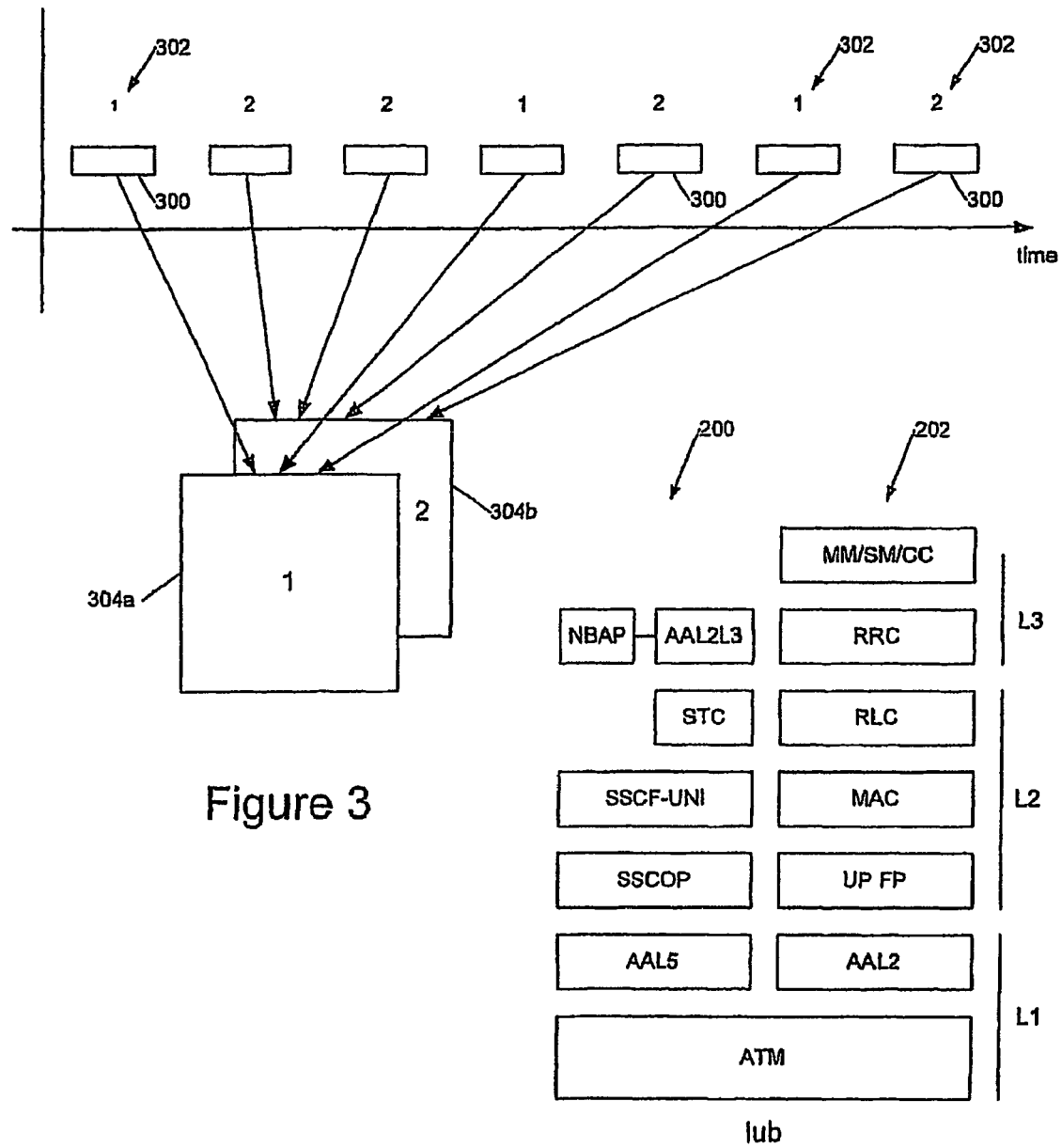
Figure 3
Figure 2
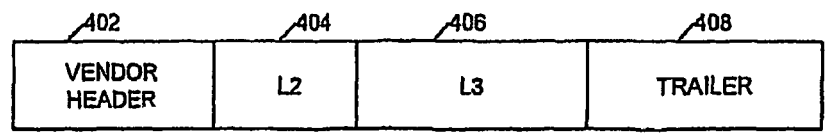
Figure 4

| MSG # | P1 | P2 | P3 | P4 | P5 | ... | CALL_ID |
|---|---|---|---|---|---|---|---|
| 000 | | | | | | | |
| 001 | | | | | | | |
| 002 | | | | | | | |
| 003 | | | | | | | |
| 004 | | | | | | | |
| 006 | | | | | | | |
| 008 | | | | | | | |
| 009 | | | | | | | |
| 010 | | | | | | | |
| 011 | | | | | | | |
| 013 | | | | | | | |
| ... | | | | | | | |

Figure 7b

| CURCALLS TABLE | HASH_ID | CALL_ID |
|---|---|---|
| (pTMSI or TMSI) | p_TMSI_and_RAI_GSM_MAP | − N2 |
|  | CONNECTION_ID | − N1 |
| (CRNC_ID) | CRNC_COMMINICATION_CONTEXT_ID | + M |
| (NODEB_ID) | NODEB_COMMINICATION_CONTEXT_ID | + M |

Figure 7c

NEGATIVE_CALL_ID TABLE

| NEGATIVE_CALL_ID | MESSAGE NUMBERS |
|---|---|
| −12 | 10, 13, 14, 16, ... |
| −13 | 11, 15, 18, ... |
| ⋮ | ⋮ |

Figure 7d

UL-SC TABLE

| HASH | |
|---|---|
| UL-SC | CRNC_COMMINICATION_CONTEXT_ID |

Figure 7e

CALL INFO TABLE

| HASH_ID | CALL_INFO DATA STRUCTURE |
|---|---|
| CRNC_COMMUNICATION_CONTEXT_ID (CRNC_ID) | UL SCRAMBLING CODE (SC) |
| | DL SCRAMBLING CODE (SC) |
| | CRNC_COMMINICATION_CONTEXT_ID |
| | NODEB_COMMINICATION_CONTEXT_ID |
| | p_TMSI_and_RAI_GSM_MAP |
| | IMSI |
| | TIME STAMP |
| | CALL RELEASE COUNTER |

Figure 7f

CONN SETUP TABLE

| HASH_ID | CALL_INFO DATA STRUCTURE |
|---|---|
| CONNECTION_ID | UL SCRAMBLING CODE (SC) |
| | DL SCRAMBLING CODE (SC) |
| | CRNC_COMMINICATION_CONTEXT_ID |
| | NODEB_COMMINICATION_CONTEXT_ID |
| | p_TMSI_and_RAI_GSM_MAP |
| | IMSI |
| | TIME STAMP |
| | CALL RELEASE COUNTER |

CALL TRACKING SYSTEMS

RELATED APPLICATIONS

This application is a continuation under 35 U.S.C. 111(a) of PCT/GB2004/050006, filed Sep. 13, 2004 and published as WO 2005/034551 A1, filed Apr. 14, 2005, which claimed priority under 35 U.S.C. 119 to United Kingdom Application No. 0322979.6, filed Oct. 1, 2003, and under 35 U.S.C. 119(e) to U.S. Provisional Patent Application No. 60/574,635, filed May 26, 2004, which applications and publication are incorporated herein by reference and made a part hereof.

This invention relates to the identification of messages relating to a particular communications session from a stream of messages, and more particularly to tracking voice and/or data call messages in packet data networks such as a UMTS mobile phone network.

FIG. 1 shows a portion of a UMTS (universal mobile telecommunications system) network 100. The UMTS system is the subject of standards produced by the Third Generation Partnership Project (3GPP, 3GPP2), detailed technical specifications for which can be found at www.3gpp.org, and these specifications are hereby incorporated by reference. Examples include TS23.101 (general UMTS architecture), TS25.101 (radio transmission and reception), TS23.060 (GPRS—General Packet Radio Service), TS25.433 (NBAP—Node B Application Part); TS25.331 (RRC—Radio Resource Control); TS24.008 (MM—Mobility Management); TS24.008 (CC—Call Control); TS25.322 (RLK—Radio Link Control); TS25.321 (MAC—Medium Access Control).

Referring to FIG. 1 the UMTS network has a plurality of fixed, base stations 102a,b,c known as node B's each coupled to a respective RNC (radio network controller) 104a,b. A plurality of mobile stations 106a,b is attached to each node B and, as illustrated, a mobile station may be attached to more than one node B when performing a soft cell handover (the two node B's in this case may be attached to the same or to different RNCs. The RNCs are coupled to an MSC (mobile switching centre) 108 and thence, via GMSC (gateway mobile switching centre) 110 to PSTN (public switched telephone network) 112. The RNCs are also attached to an SGSN (serving GPRS support node) 114 and thence via a GGSN (gateway GPRS support node) 116 to the internet 118.

In this specification the term mobile station does not imply a limitation to any particular type of network and includes user equipment (Ue) in a UMTS network.

The interfaces between a node B and an RNC is known as the Iub (Iu bis interface) and data on this interface includes many RF parameters, as described in more detail in the 3GPP technical specifications mentioned above, which it is useful to have access to for optimisation of a network, the air interface being one of the most difficult parts of the network to optimise. Many other interfaces are defined in the 3G technical specifications and some of these are shown in FIG. 1, in particular the Iur interface between two RNCs, the IuCS (circuit switched) interface between an RNC and an MSC, and the IuPS (packet switched) interface between an RNC and an SGSN. A protocol stack is associated with each interface in which, broadly speaking, lower level protocols implemented on a network element transparently relay higher level signalling, often at different lower level protocols being used between different pairs of network elements. Different protocols may also be employed, at least at higher levels, for user plane and control plane (signalling) messages.

FIG. 2 shows the control plane protocol stacks implemented at the Iub interface; it can be seen that there are two protocol stacks defined, a first stack 200 for NBAP (node B application part) messages and a second stack 202 for RRC (radio resource control) messages. The RRC messages in particular include useful information such as scrambling code and channel information, bit rate information, interference parameters and the like. It will be appreciated that a data packet or message at, say, the Iub interface is in general different to a data packet or message at another interface such as, for example, the Iu, (ie IuCS, or IuPS) interface.

It can be helpful to divide the stack into layers (broadly, but not exactly, corresponding to the OSI—open systems interconnect—model) as illustrated in which layer 1 (L1) comprises an ATM (asynchronous transfer mode) transport layer, layer 2 (L2) comprises an RLC (radio link control) and MAC (medium access control) layer, and layer 3 (L3) comprises, in the control plane, higher level signalling messages such as RRC (radio resource control) and NAS (non-access stratum) messages, which are particularly useful for implementing embodiments of the invention described later. The layer 2 messages in the data plane comprise unacknowledged service messages such as UDP (user datagram protocol) and speech messages with error detection and acknowledged service messages such as multi media service messages with ARQ (automatic repeat request); however we are mainly concerned with the control plane.

Referring to FIG. 2 in more detail both the protocol stacks have a common underlying ATM layer. The NBAP stack then has AAL5 (ATM adaption layer type 5), SSCOP (service specific connection oriented protocol), SSCF-UNI (service specific coordination function—user network interface), STC (signalling transport converter), AAL2L3 (AAL2 layer 3 protocol) and NBAP. The RRC stack has AAL2 (ATM adaption layer type 2), then UP FP (user plane frame protocol), MAC, RLC and RRC and then above this MM/SM/CC (mobility management/session management/call control). The underlying ATM transport layer creates pathways between network nodes which are called virtual circuits or channels (ATM terminology) and these are identified by a 5 byte ATM header in the 53 byte ATM cell comprising a set of three parameters, VPI (virtual path identifier), VCI (virtual channel identifier, which with VPI represents ATM cell routing information) and, for AAL2, CID (channel identifier) in a call, as described further later (not to be confused with the possibility of a mobile station implementing two or more calls simultaneously, for example a voice call and a data call). In 2G GSM (group system for mobile communications) networks the corresponding A bis interface is much simpler in that a plurality of E1 (2.048 Mbps) or T1 (1.544 Mbps) data feeds are employed each comprising a plurality of time domain multiplexed PCM (pulse code modulation) channels, a mobile station call occupying a fixed time slot. However UMTS employs ATM technology and statistical rather than time division multiplexing with dynamic assignment of resources so that tracking packets relating to a particular call is very much more difficult.

Broadly speaking embodiments of the present invention are concerned with the problem of assigning call identities to data packets in a UMTS network captured from an interface such as the Iub interface. Here a call comprises a voice or data communicaiton between two entities, generally a mobile station (MS) or other user equipment (for example a wireless PDA, personal digital assistant) and another entity such as another MS, a server on the internet and the like. Applications of embodiments of the invention are not limited to the Iub interface but may be employed at other interfaces, in particular other Iu interfaces such as the Iur interface. However embodiments of the invention will be described with particular reference to the Iub interface, firstly because this provides some of the most useful information, and secondly because this is the most difficult interface at which to call track. Once a call identifier has been attached to each packet, or more generally message (since some messages span more than one ATM cell) at least in so far as is possible, the information contained within the messages may be analysed in any desired way, for example in order to troubleshoot and/or optimise a portion of the network. In practice, therefore, one is particularly interested in signalling messages rather than, say, user data since, generally speaking, it is the signalling which provides information on the operation of the network. Thus, in practice, user data (and optionally some types of signalling data such as measurement reports on common channels) need not be processed. However it is desirable to capture some types of common channel message which are broadcast but intended for a particular mobile, such as a paging message.

FIG. 3 shows, diagrammatically, a stream of messages 300 captured from an interface of a UMTS network, each of the messages being assigned a call identifier 302 by call tracking/discrimination software as described later, these messages then being grouped into two sets 304a,b for later analysis of the sequence of signalling, for example to determine reasons for dropped calls and the like. The call or communications session identifiers 302 may be arbitrarily assigned but once assigned are preferably only associated with the identified call, at least until the call ends.

To capture data from an interface a so-called protocol analyser may be employed. A protocol analyser comprises equipment to tap a link or interface between infrastructure elements (either logical or physical) and, broadly speaking, simply records all the data on such a link or interface in a file sometimes known as a 'trace file'. It will be appreciated that such files may run to many hundreds of megabytes and may contain substantially all the messaging between the two elements connected by the link or interface being tapped (although in practice protocol analysers can miss the occasional message). Additionally or alternatively to providing the captured data as a file a protocol analyser may provide the data over a high speed link such as an SDH (synchronous digital hierarchy) link for remote access. There are some protocol analysers which are intended for use with UMTS networks— the main manufacturers of these are NetHawk Oyj in Finland (NetHawk 3G series of products) and Tektronix, Inc of Oregon, USA (for example the K1297); other manufacturers of protocol analysers include Agilent, and Edixia of Telecom Technologies, France (for example the UMTS Ocean instrument). Protocol analysers from these manufacturers can capture ATM packets and some also provide a limited degree of decoding, for example assigning a packet to either the NBAP or RRC stack at the Iub interface and, where a signalling message comprises more than one packet (for example the relatively long RRC Connection Setup message) reassembling the message at the L2 level.

FIG. 4 shows a typical structure of a message 400 captured by a protocol analyser from a stream of messages flowing across an interface. The message 400 comprises a vendor specific header 402, for example providing time information, data length and parameters such as VPI, VCI and CID followed by L2 data 404 such as RLC/MAC data, followed by higher level data such as L3 data 406 such as higher level signalling message data, followed by a trailer 408 including, for example, CRC (cyclic redundancy check) data and the like.

From the above discussion it will be appreciated that allocating messages captured at an interface in a UMTS network to particular communications sessions presents a difficult problem. Although a network element such as a node B may understand which packet belongs to which communications session an individual packet may contain only a few or no signalling parameters at L2 and above and the ATM virtual channel routing information is not constant within a call so this does not provide an unambiguous call identifier. Uplink and downlink messages may employ the same or different ATM virtual channels and messages belonging to a single call may use different ATM virtual channels at different times. Furthermore although messages often contain a range of signalling parameters many of these are optional and cannot be relied upon and, in particular, the IMSI (international mobile subscriber identity) may never appear in the signalling sequence involved in setting up a call. The situation is further complicated by the possibility of missing messages, either by starting to capture data mid-call or because a protocol analyser fails to capture a message.

According to a first aspect of the invention there is therefore provided a method of identifying messages associated with a communications session in a stream of messages captured from an interface within a network, the network including a fixed station in wireless communications with a plurality of mobile stations, said communications session being associated with one of said mobile stations and said stream of messages including messages for a plurality of communications sessions, the method comprising: inputting a portion of said stream of messages; reading network signalling data from said messages of said inputted stream, said signalling data including a plurality of network signalling parameters; assigning a first session identifier to at least one message having a first signalling parameter; assigning a second session identifier to at least one message having a second signalling parameter; identifying a message having both said first and said second signalling parameters; and identifying messages of said communications session by linking said at least one message having said first session identifier and said at least one message having said second session identifier using said message having both said first and said second signalling parameters.

The first and second signalling parameters need not always be present in each message but providing the messages can be grouped into sets and linked by at least one message with both these parameters in effect chains may be extended forwards and backwards from the message with both parameters to identify messages associated with a particular communications session or call. These messages may then be output, for example to a file, either grouped according to the session or call identity or, more preferably, in sequence with a call or session identifier accompanying any signalling parameters read from the messages, for example as a time-ordered sequence. The messages may comprise or be derived from data packets such as ATM cells and an ATM virtual connection identifier may be employed as the first signalling parameter, depending upon which messages are to be linked. The stream of messages may be taken from any point within the network but preferably the interface is a defined interface, in a UMTS network in particular an interface defined in one of the above mentioned 3G specifications.

Some messages will be assigned the first session or call identifier and some the second session identifier even though all these message may belong to a single session or call and thus when the two sets of messages have been linked this effective ambiguity may be resolved by converting one identifier to the other, for example by giving all messages with the first session identifier the second session identifier. Advantageously the first and second session identifiers may be managed by making one, say the second session identifier, positive and the other negative.

The linking of sets of messages may be indirect so that, for example, the message having the second signalling parameter may also possess a third signalling parameter so that assigning the second session identifier to this message also associates this identifier with the third signalling parameter. For example, in a UMTS network the second signalling parameter may comprise a scrambling code (SC) such as a long or up link (UL) scrambling code and the third signalling parameter may comprise an RNC identifying parameter (sometimes referred to later, in short form, as a CRNC identifier or more precisely as a CRNC communication context identifier when the parameter identifies a communication session or communication context associated with the RNC rather than the RNC itself). Then when, for example, the first signalling parameter comprises a packet TMSI (temporary mobile subscriber identity) associated parameter the CRNC may be assigned a second session identifier, which is also associated with a scrambling code and for which, at some point, there is expected a connection setup message including both the scrambling code and the packet TMSI associated parameter.

In practice the linking of sets of messages may be still more complicated in that there may be more than two sets or groups of messages to which session identifiers are (temporarily) assigned pending resolution as to which session or call they belong to. Thus the method may further comprise assigning a third session identifier to a message having a fourth signalling parameter, such as an ATM virtual connection identifier, and then identifying a message having both the second and fourth signalling parameters to link groups of messages with the first and third session identifiers.

As mentioned above some interfaces, for example the Iub interface, have two protocol stacks and in this case one of the session identifiers may be associated with messages on one of the stacks and another session identifier with messages according to a second of the protocol stacks so that, by identifying a message with both the first and second/third signalling parameters messages using the two different protocol stacks may be linked.

In some cases it may be difficult or impossible to link sets of messages based upon signalling parameters alone and in such situations message time may also be employed to link groups or sets of messages. To employ this technique preferably two messages are selected, one of which is a response to the other—for example a Connection Setup Message and a Connection Setup Complete message. Thus the time interval between two such messages may be determined and where this is less than a threshold value, for example less than ten seconds or less than one second one of the messages may be assumed to be a response to the other within the stream of captured messages, thus allowing two groups of messages to be linked and given the same session identifier.

Preferably the network comprises a 3G mobile phone network, more particularly a UMTS network. In such a network it is advantageous to select particular signalling parameters which have been experimentally observed to be reliable as links between groups of messages. Thus the first signalling parameter may comprise a TMSI and/or packet TMSI related signal, for example from a mobile-originating Connection Request signal or an ATM connection identifier from a mobile-originating Connection Setup Complete message (all on the RRC stack). Likewise the second signalling parameter may comprise a scrambling code related parameter, for example a Radio Link Setup Request message from an RNC to a node B, and the third signalling parameter may comprise an RNC identifier (also present in the Radio Link Setup Request message as well as, together with a node B identifier, in a Radio Link Setup Response message), these messages employing the NBAP stack. The (RRC) Connection Setup message then links these two stacks by linking scrambling code and packet TMSI, and the scrambling code, via the RNC identifier, may later be used to attach a session identifier to an ATM connection identifier (using a Radio Bearer Setup message, which in turn can be used to assign a session identifier to an earlier Direct Transfer message employing the same ATM connection identifier.

In preferred embodiments of the method session identifiers are preferably allocated to at least each control plane (signalling) message, at least where sufficient messages are present to allow linking of different session identifiers into a single thread. Signalling parameters from the messages may then be stored in a sequence state data structure in association with each session identifier, in a time ordered sequence, to facilitate subsequent data processing. Preferably in this data structure all the messages associated with a particular call have a common communications session identifier, and preferably each communications session in a captured stream of data has its own unique identifier. Thus, broadly speaking, captured messages from a stream of messages are grouped into sets using one or more parameters associated with each message, and each set is temporarily assigned an identifier. Sets with different identifiers but corresponding to the same call are then linked using the message parameters by identifying messages or chains of messages with parameters in common and/or by assuming that a message and its response which are close together in time are linked. Once the sets of messages have been linked so far as is possible a common identifier can be allocated to the linked sets of messages to create a single thread running through the stream of messages. It will be recognised, however, that a plurality of sets of messages may need to have temporarily assigned identifiers before it becomes possible to link the sets of messages, which is why it is advantageous to provisionally assign identifiers until these can be resolved. The temporary assignment of session identifiers means, in effect, that the order in which the messages arrive need not substantially affect the call tracking procedure. Temporarily assigning session identifiers in this way also facilitates linking of two different protocol stacks employed for a single call. Moreover it is important in a UMTS network to identify the most useful parameters for linking, which in particular include the scrambling code (long or UL). Where more than one radio link is provided for a single mobile station, for example because of a simultaneous voice and data call, this may be tracked as, in effect, two separate calls.

According to a second aspect of the present invention there is provided a method of identifying messages associated with a communications session in a stream of messages captured from an interface within a UMTS-type network, the network including a fixed station in wireless communications with a plurality of mobile stations, said communications session being associated with one of said mobile stations and said stream of messages including messages for a plurality of communications sessions, the method comprising: inputting a portion of said stream of messages; reading network signalling data from said messages of said inputted stream, said signalling data including a plurality of network signalling parameters; assigning a first session identifier to a message having a first signalling parameter assigning said first session identifier to others of said messages also having said first signalling parameter; identifying a said data communications session using said first session identifier; and outputting data identifying messages belonging to said identified communications session. The invention also provides computer program code, optionally on a carrier, configured to, when running, implement the above described methods, and a computer system including this program code. The code may be written in any conventional programming language, for example Visual C++, or may comprise code for setting up or controlling an ASIC (application specific integrated circuit) for FPGA (field programmable gator ray) or code for a hardware description language, or even micro code. The code may be distributed between a plurality of coupled components in communication with one another, for example on a network. The data carrier may comprise a disk such as a CD- or DVD-ROM, programmed memory such as read only memory (firmware), for example for downloading a disk image or DLL (dynamically linked library) module from a website.

Thus in a further aspect the invention provides a carrier carrying processor control code to identify messages associated with a communications session in a stream of messages captured from an interface within a network, the network including a fixed station in wireless communications with a plurality of mobile stations, said communications session being associated with one of said mobile stations and said stream of messages including messages for a plurality of communications sessions; the code comprising code to, when operating: input a portion of said stream of messages; read network signalling data from said messages of said inputted stream, said signalling data including a plurality of network signalling parameters; assign a first session identifier to at least one message having a first signalling parameter assign a second session identifier to at least one message having a second signalling parameter identify a message having both said first and said second signalling parameters; and identify messages of said communications session by linking said at least one message having said first session identifier and said at least one message having said second session identifier using said message having both said first and said second signalling parameters.

The invention further provides a computer system for identifying messages associated with a communications session in a stream of messages captured from an interface within a network, the network including a fixed station in wireless communications with a plurality of mobile stations, said communications session being associated with one of said mobile stations and said stream of messages including messages for a plurality of communications sessions, the computer system comprising: an input to receive message data; data memory to store captured messages, associated decoded signalling parameter data, session identification data, and output data; program memory storing processor implementable instructions; and a processor coupled to said data memory and to said program memory to load and implement said instructions, said instructions comprising instructions for controlling the processor to: input a portion of said stream of messages; read network signalling data from said messages of said inputted stream, said signalling data including a plurality of network signalling parameters; assign a first session identifier to at least one message having a first signalling parameter assign a second session identifier to at least one message having a second signalling parameter identify a message having both said first and said second signalling parameters; identify messages of said communications session by linking a message having said first session identifier and a message having said second session identifier using said message having both said first and said second signalling parameters; and output data identifying messages comprising at least part of said identified communications session.

These and other aspects of the present invention will now be further described, by way of example only, with reference to the accompanying figures in which:

FIG. 2 shows control plane protocol stacks at the Iub interface of the network of FIG. 1;

FIG. 3 shows, diagrammatically, allocation of call identifiers to messages of a stream of messages;

FIG. 4 shows an example of a structure of a message captured by a protocol analyser at an interface of the network of FIG. 1;

FIGS. 7a to 7g show, respectively, a flow diagram of a data packet pre-processing procedure, a time series data structure for use with embodiments of the invention, and data tables for use with embodiments of the invention;

FIG. 21 shows an example of a text output from an embodiment of the present invention.

A preferred embodiment of the invention will now be described with particular reference to the Iub interface of a UMTS network. This is a particularly difficult interface to handle although, as previously mentioned, the relatively low level information from this interface can also be very valuable in troubleshooting and/or optimising a network. However applications of embodiments the invention are not limited to the Iub interface and the techniques described below are applicable to many other interfaces within a UMTS network and, more generally, to other types of network, which need not even be mobile phone networks.

Figure 5:
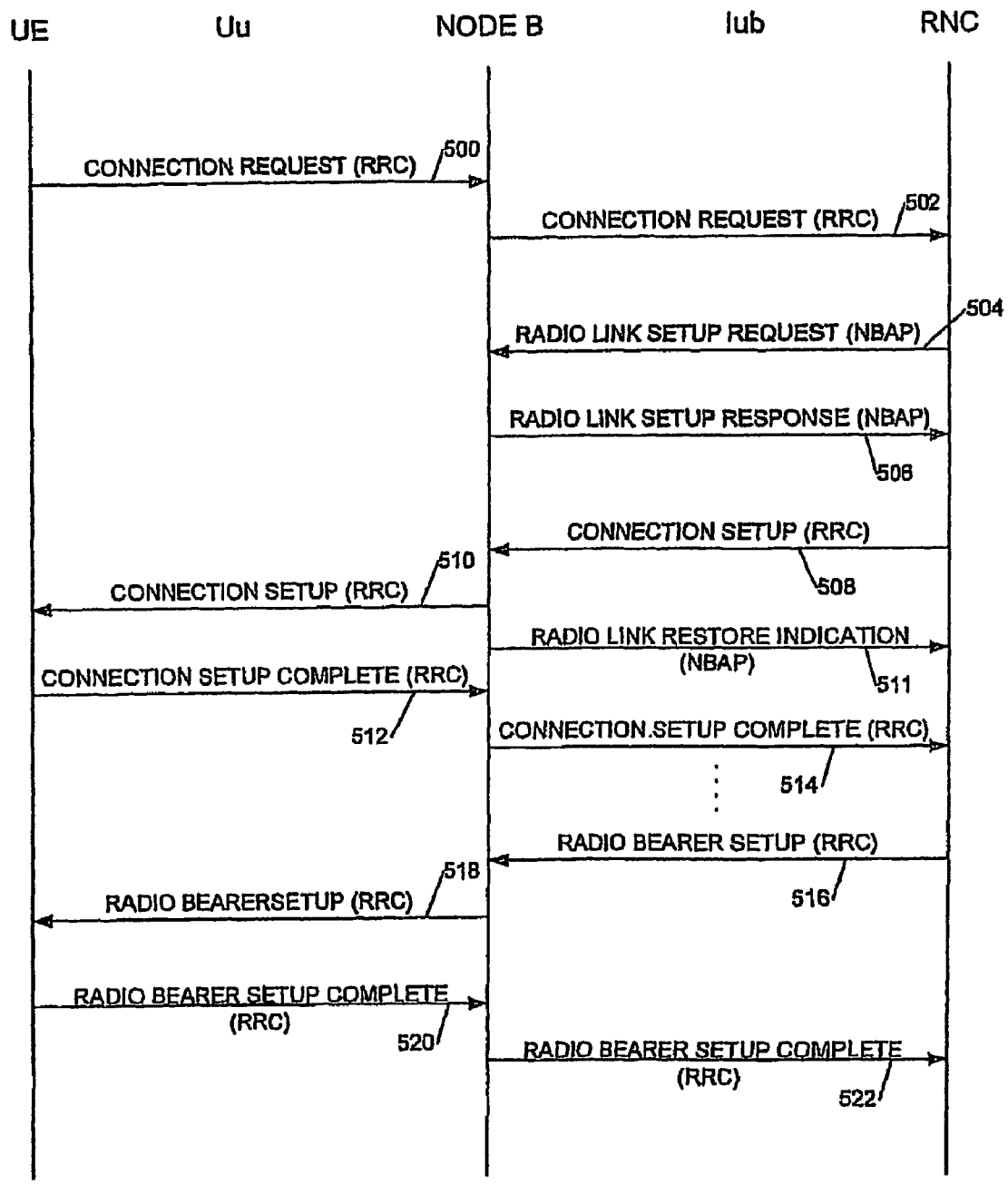
FIG. 5 shows a portion of a UMTS service request procedure.

Referring to FIG. 5 this shows a selection of messages sent between a mobile station (MS) or user equipment (UE), a Node B, and an RNC in a UMTS network according to the 3GPP(2) technical specifications, when a call is made from a mobile.

Initially a Connection Request signal 500 is sent from the UE to the Node B using the RRC stack and a corresponding Connection Request 502 (though not the same message) is sent from the Node B to the RNC. The RNC then sends a Radio Link Setup Request 504 to the Node B which responds to the RNC with a Radio Link Setup Response 506. The RNC then sends a Connection Setup message 508 to the Node B and the Node B sends a Connection Setup message 510 to the mobile station, which responds (after a Radio Link Restore Indication message 511) with a Connection Setup Complete message 512 to the Node B, which in turn sends a Connection Setup Complete message 514 to the RNC. Various other messages may then be exchanged, some optional, these comprising Initial Direct Transfer CM Service Request; RRC Security Mode Command (from RNC); RRC Security Mode Complete (to RNC); RRC DL Direct Transfer (MM Id Request) (from RNC); RRC UK Direct Transfer (CC Setup) (to RNC); RRC UL Direct Transfer (MM Id Response) (to RNC); and RRC DL Direct Transfer (CC Call Proceeding) (from RNC) messages. These relate to security and authentication and the call setup procedure. The RNC then sends a Radio Bearer Setup message 516 to the Node B and the Node B sends a Radio Bearer Setup message 518 to the mobile station and the mobile station responds with a Radio Bearer Setup complete message 520 to the Node B and the Node B sends a corresponding Radio Bearer Setup Complete message 522 to the RNC. In each case the stack involved is indicated in brackets.

Figure 6:
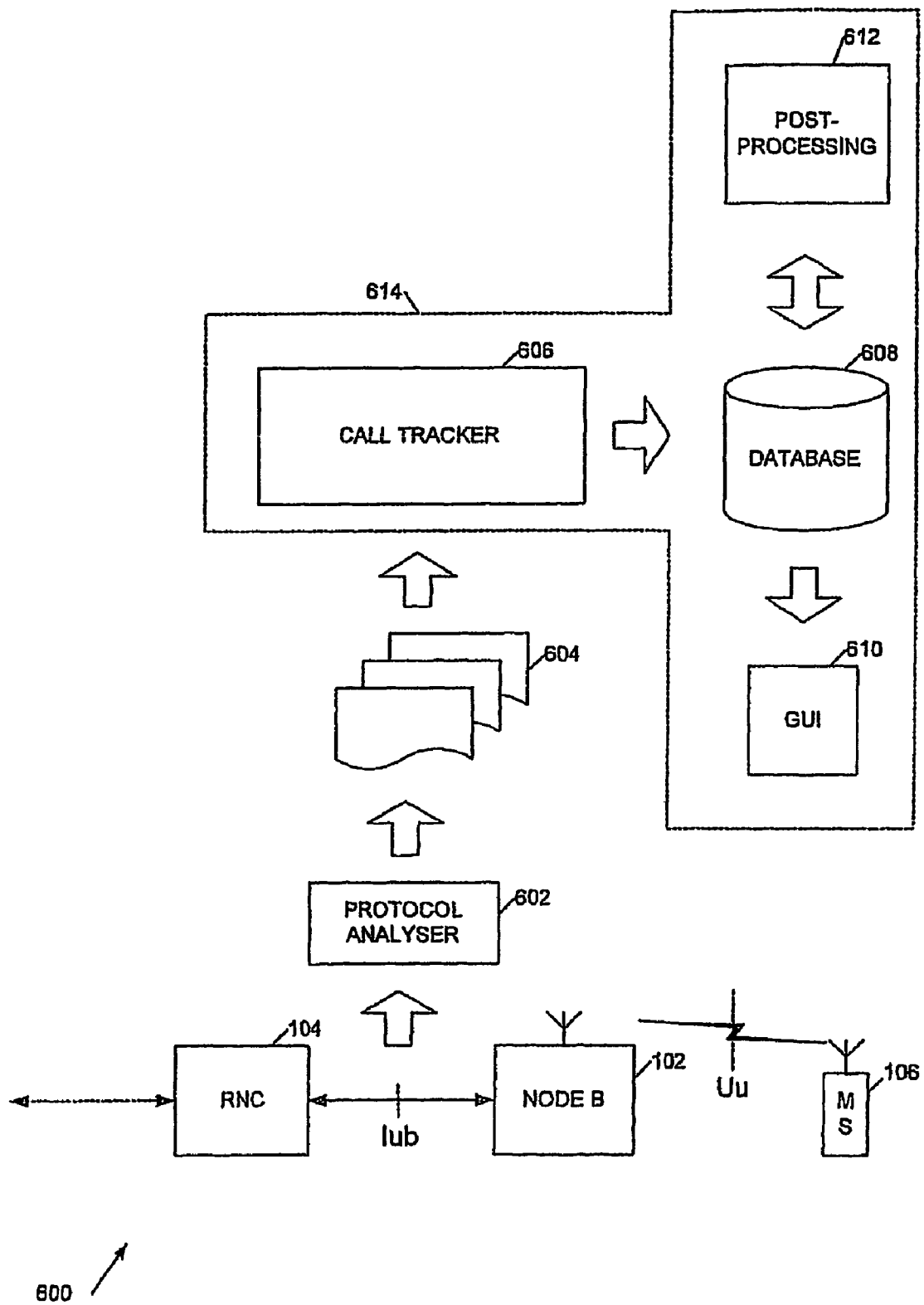
FIG. 6 shows a block diagram of a call tracking system including data capture and analysis devices.

FIG. 6 shows an overview of a call tracking system 600, as illustrated operating at the Iub interface. Thus a protocol analyser 602 captures data from the Iub interface and writes this to one or more data files 604 which provide an input to a call tracker 606, for example running a software described below on a general purpose computer system such as a laptop. The call tracker 606 provides a data output to a database 608 or other data structure, typically in local memory (RAM) and/or stored on the hard disk of the laptop. This data may then be manipulated in a number of ways using graphical user interface 610, for example to follow the progress of a particular call and/or to output data from the database to one or more other software packages 612 for further analysis. The elements within dashed line 614 may be considered to make up a call analysis system.

Figure 7A:
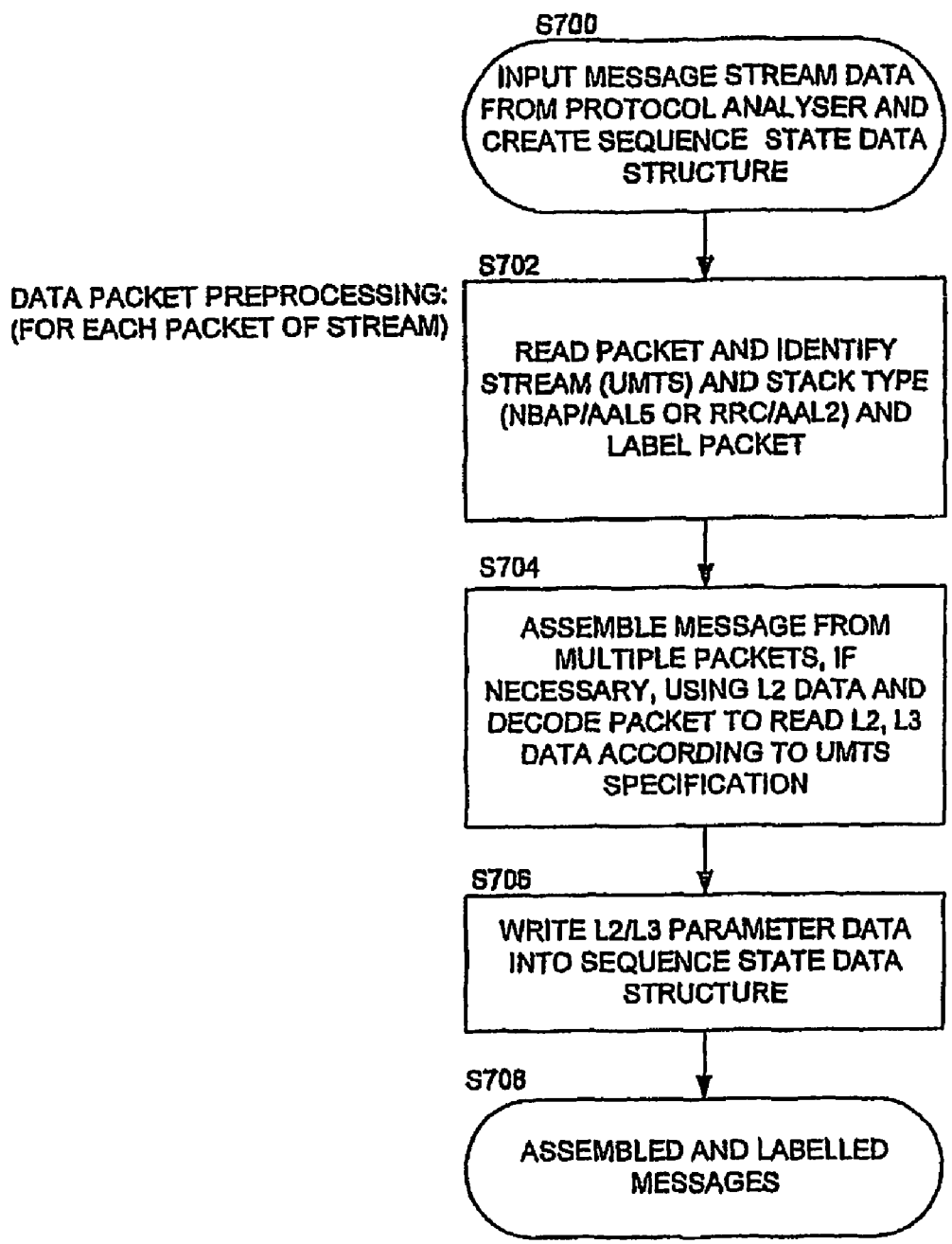

FIG. 7a shows a data packet pre-processing procedure which may be applied to each packet of a stream of packets collected by the protocol analyser 602 of FIG. 6. This packet preprocessing is optional as the protocol analyser (for example one of the previously mentioned protocol analysers) may provide this function. At step S700 the procedure reads message stream data from the protocol analyser, either directly via a network or from a file, and initialises a sequence state data structure as described below with reference to FIG. 7b, which illustrates the concept of the data structure (where no data packet preprocessing is employed initialisation of the sequence state data structure may be performed when the call tracking program is started). Then a sequence of steps S702-S708 is performed for each packet of the data stream.

Thus at step S702 a data packet is read to identify the stream type (optional—UMTS may be assumed) or more precisely the interface type, and the stack type—either NBAP using AAL5 or RRC using AAL2. This may be performed by sending a predetermined number of messages, say 10,000, to a set of stack decoders and allocating a score or percentage to each dependent upon the number or fraction of messages successfully decoded. The decoder with the best score and/or score greater than a threshold, say 98%, may be assumed to identify the stack to which the messages belong. A stack type label may be temporarily stored in the sequence state data structure for the packet, for later decoding. Then at step S704 the packet is decoded to read layer two and layer three data according to the UMTS (3GPP) specification and, at step S706, parameter data such as radio link operation parameter data for the packet is written into the sequence state data structure. Either all the available parameters in the packet may be stored in the data structure or just those parameters which are needed for later analysis. If necessary the procedure assembles a message from multiple packets, where necessary using layer two data (for which layer three data is the payload) so that each message rather than each packet may be numbered. The assembled and labelled messages from the procedure together with the message parameters and stack type information (in the sequence stage data structure) comprise the output of the procedure.

FIG. 7b shows, diagrammatically, an example of a sequence state data structure for the call tracking procedure. This comprises a sequence of numbered messages (for various reasons some messages may be missing) each having none, one or more associated parameters and a corresponding call identifier. Broadly speaking, the call tracking procedure attempts to allocate a call identifier to each message. The aim of an embodiment of the call tracking procedure is to allocate a unique call identifier to each call on the interface at any one time so that each of the messages can be allocated to a call (although in practice it is not always possible to allocate every message to a call for example because a call is ongoing when data capture begins or because a protocol analyser cannot keep up with a high data rate burst).

FIGS. 7c to 7g show look-up tables or maps which are temporarily employed by the call tracking procedure whilst processing a file; these are generally accessed by hash keys.

FIG. 7c shows a current calls (CURCALLS) table in which there are four hash keys for a single table, each mapping to a CALL_ID. In embodiments of the procedure both positive and negative call identifiers are employed, negative call identifiers being provisionally allocated until a link to a thread with a positive call identity can be made. Thus in the current calls table the CONNECTION_ID and the p_TMSI_and_RAI_GSM_MAP HASH_IDs have first and second negative call identifiers respectively when first assigned, later linked to positive call identifiers, and the CRNC_COMMINICATION_CONTEXT_ID and NODEB_COMMINICATION_CONTEXT_ID have positive call identifiers. To reduce the risk of collisions the different types of hash key may have different most significant bits set to distinguish them, providing that sufficiently many bits are employed for these keys.

FIG. 7d shows a NEGATIVE_CALL_ID table listing negative call identifiers, and for each negative call identifier a list of messages having that identifier.

FIG. 7e shows a UL-SC (or long scrambling code) table or map linking UL-SC to CRNC_COMMINICATION_CONTEXT_ID.

FIG. 7f shows a CALL_INFO table or map with a CALL_INFO data structure keyed by CRNC_COMMUNICATION_CONTEXT_ID. The CALL_INFO data structure comprises UL SCRAMBLING CODE (SC), DL SCRAMBLING CODE (SC), CRNC_COMMUNICATION_CONTEXT_ID, NODEB_COMMUNICATION_CONTEXT_ID, p_TMSI_and_RAI_GSM_MAP (which need not be used in the call info table, depending upon the implementation), IMSI (international mobile subscriber identity), a TIME STAMP, and a CALL RELEASE COUNTER. The TIME STAMP in the CALL_INFO table is determined by the Radio Link Setup Response message, which occurs at the start of a call, and is used (in conjunction with a Radio Link Release Acknowledge message) to time a call. The call release counter is used to distinguish between a true end of call and some other event such as a soft call handover ("handoff" in the USA). Thus this counter is zeroed by certain messages (for example Radio Link Setup Request) and incremented by other messages (Direct Transfer CC Release and CC Release Complete messages) so that a non-zero value indicates a true end of call.

FIG. 7g shows a CONN_SETUP (connection setup) table which is keyed by CONNECTION_ID and which, in this described embodiment, for convenience, employs the same CALL_INFO data structure as the CALL_INFO table of FIG. 7f, although this data structure is not fully populated. Thus in the CONN_SETUP table the CALL_INFO data structure employs UL SCRAMBLING CODE (SC), p_TMSI_and_RAI_GSM_MAP, TIME STAMP and a CALL RELEASE COUNTER. (In FIGS. 7f and 7g the unused parameters are shown in italics). Optionally the IMSI, TMSI (eg TMSI_GSM_MAP or TMSI-related variants), and/or p-TMSI (ie p_TMSI_and_RAI_GSM_MAP) may be combined into a single mobile station identifier MSId which uses whichever of the IMSI, TMSI and p_TMSI is available. In the CONN_SETUP table the time stamp is determined by the Connection Setup message (to facilitate time-based linking of the Connection Setup message to a later, Connection Setup Complete message) and the call release counter is zeroed by the Connection Setup message. The CONN_SETUP table is keyed by the CONNECTION_ID which comprises the set of VPI, VCI and CID from the ATM header, as described above. (In general 'CONNECTION_ID' is employed here to represent a set of VPI, VCI and, preferably, CID).

Figure 8A:
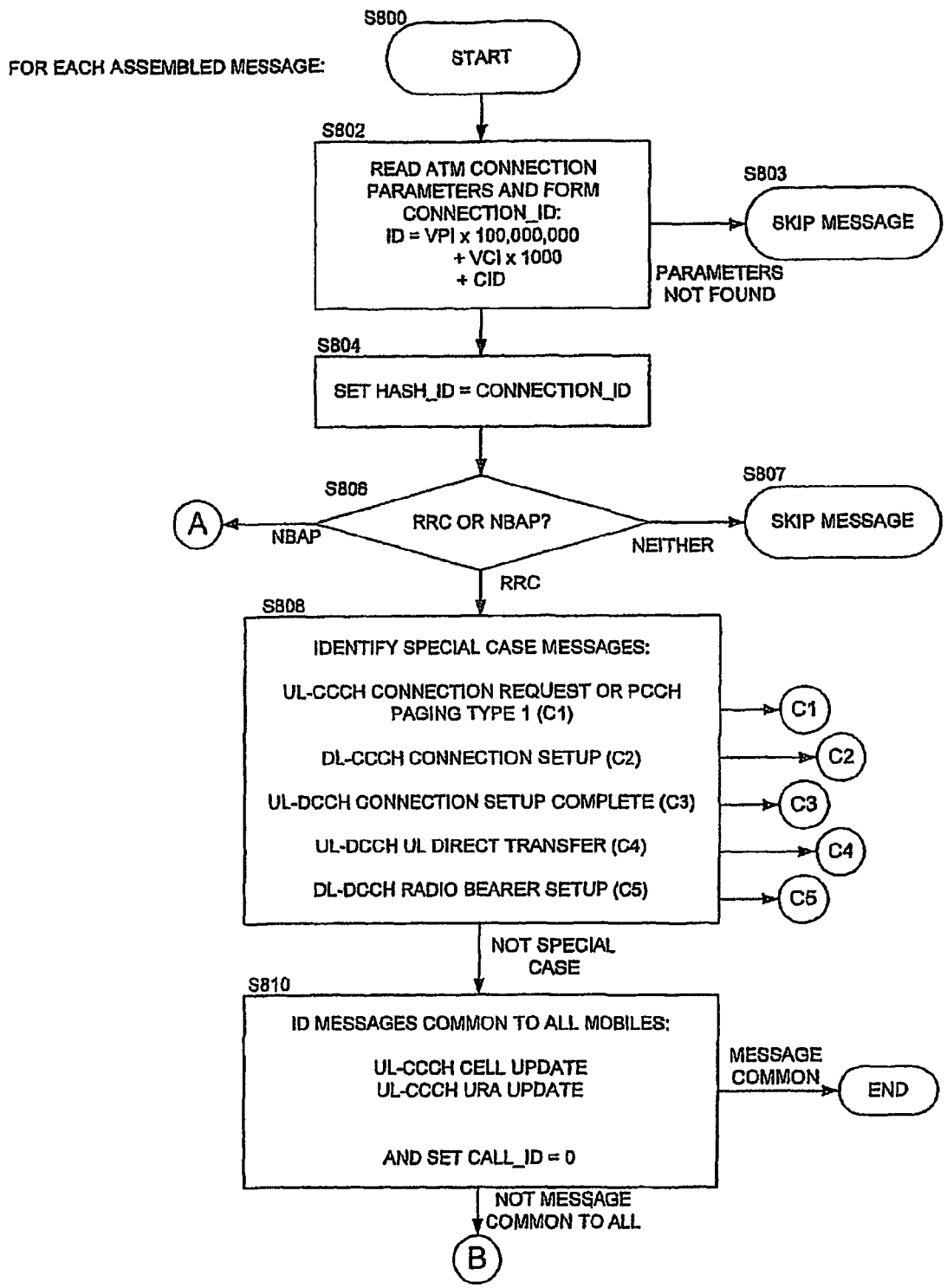
FIGS. 8a and 8b show an RRC stack message processing procedure.
Figure 8B:
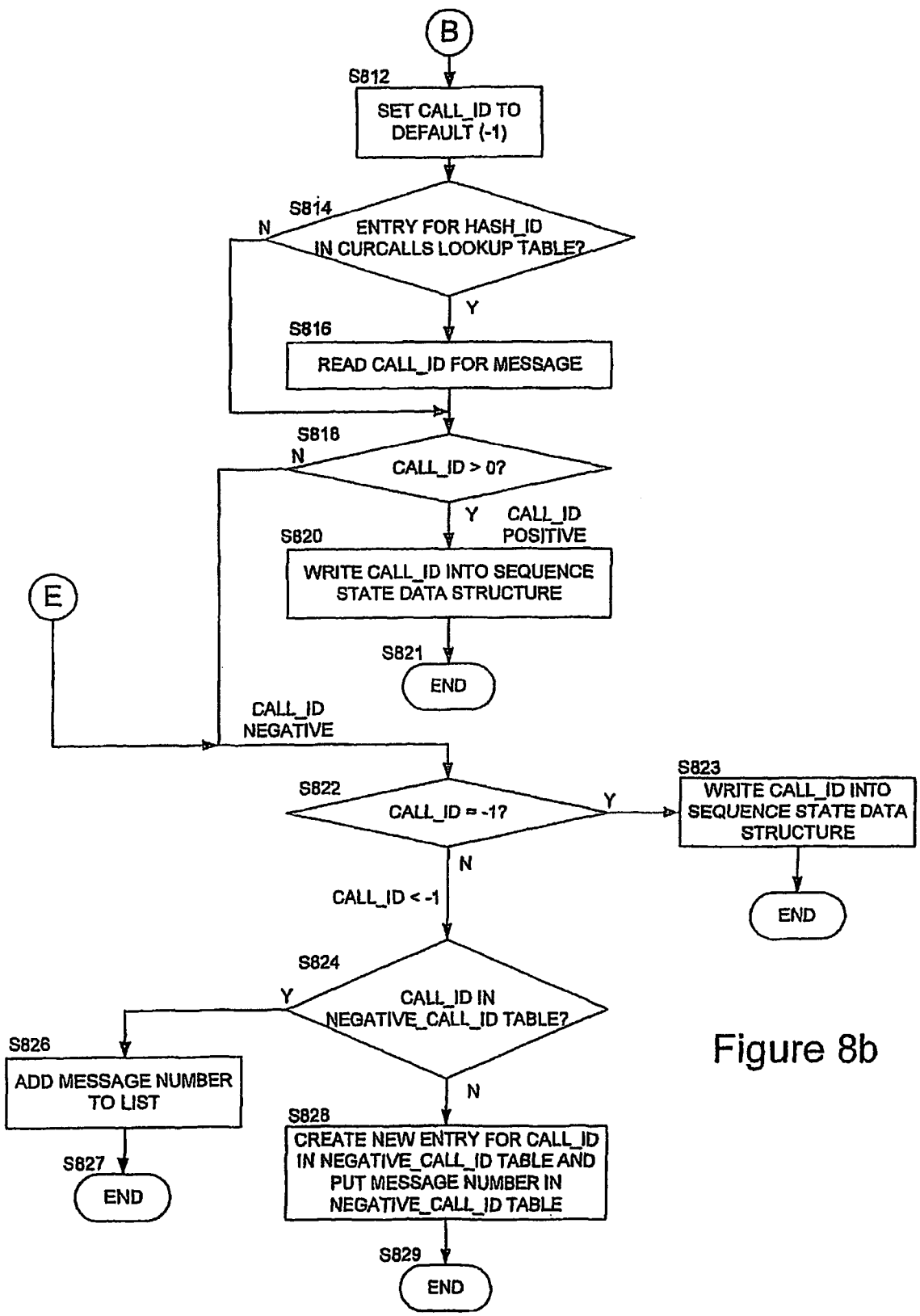

Referring now to FIGS. 8a and 8b, these show a portion of a flow diagram of a call tracking procedure, in particular dealing with RRC stack messages. The procedure operates on each message, where necessary assembled from more than one data packet.

The procedure begins at step S800 and at step S802 reads the ATM connection parameters for the message and forms a connection identifier from VPI, VCI, and CID as follows:

CONNECTION_ID=VPI×100,000,000+VCI×1000+CID

This is because CID is 8 bits (0-255), VCI is 16 bits (0-65535), and VPI is a maximum of 12 bits (0-4095) and thus Connection_ID provides a single (64 bit) number which identifies a set of these three parameters.

Then, at step S804, the HASH_ID (for keying into the tables of FIG. 7) is set to the connection identifier.

At step S806 the procedure determines whether the message protocol is RRC or NBAP, or neither (for example because it comprises user data, a low level control message, or an ALCAP (access link control application part) message). As described further below Nokia NBAP messages use a slightly different NBAP stack and therefore step s806 may further identify a Nokia NBAP message for processing as described later.

Figure 9:
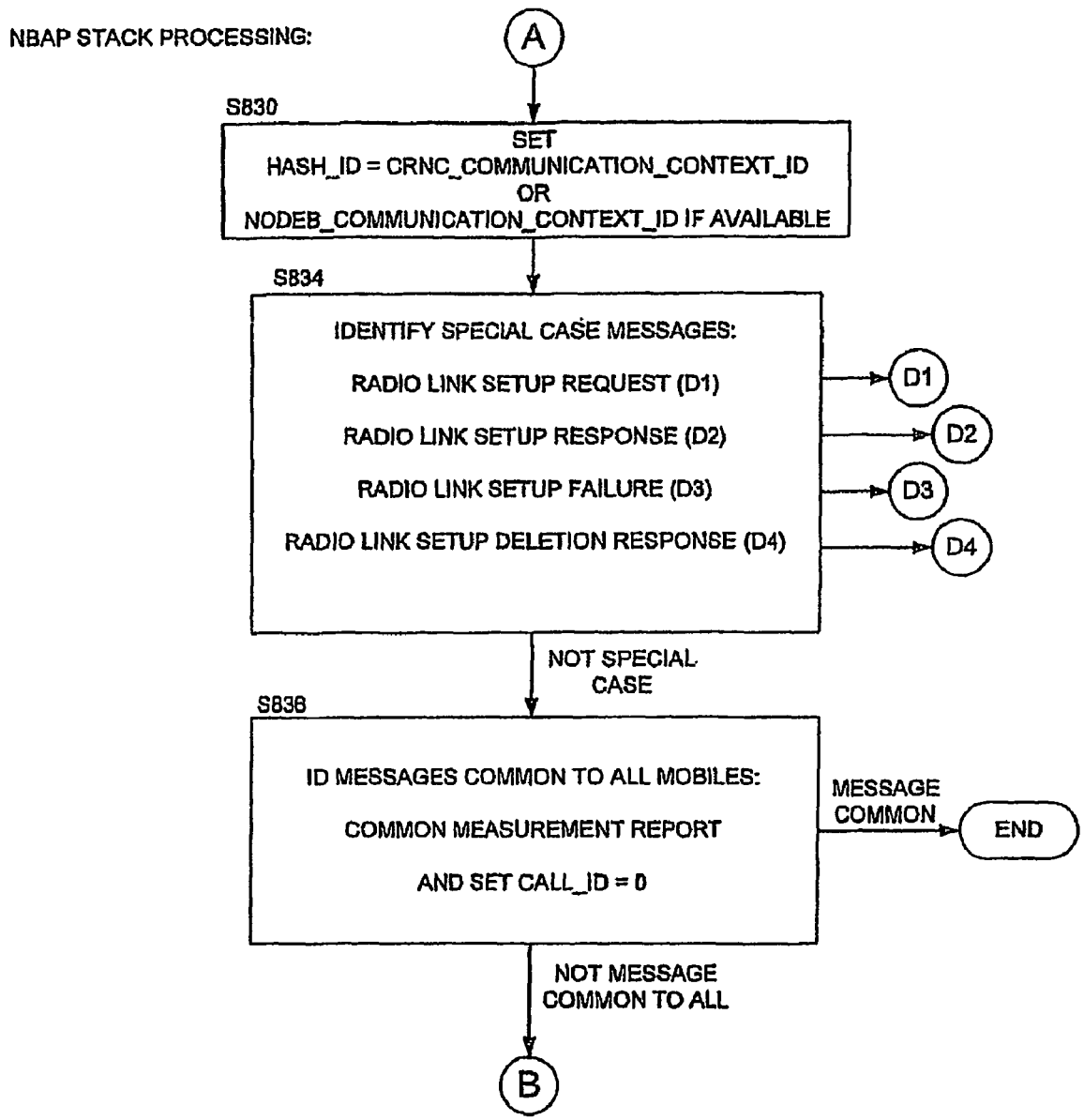
FIG. 9 shows a NBAP stack message processing procedure.

If the message is identified as an RRC protocol message the procedure continues with step S808, otherwise for an NBAP message the procedure continues as shown in FIG. 9.

At step S808 the message is read to determine whether it is one of a set of special case messages comprising a UL-CCCH CONNECTION REQUEST or PCCH PAGING TYPE 1 message, a DL-CCCH CONNECTION SETUP message, a UL-DCCH CONNECTION SETUP COMPLETE message, a UL-DCCH UL DIRECT TRANSFER message, and a DL-DCCH RADIO BEARER SETUP message. The handling of these different special case messages is described later. If the message is not one of the special case messages the procedure continues at step S810 and determines whether the message is one of a number of common case messages (common cases for all mobiles, that is not associated with a particular MS). These common messages comprise a UL-CCCH CELL UPDATE message and a UL-CCCH URA UPDATE message. For all of these common case messages the CALL_ID is set to a predetermined value, for example zero, as a convention for identifying common case messages. The procedure then ends. If the message is not a 'common case' then the procedure continues with step S812.

At step S812, the procedure sets the CALL_ID to a default value, here −1. A call identifier of −1 (default) signifies that the message cannot be assigned to a call, for example because information needed to assign the message has been missed, for example because the start of the call was missed or a message was dropped. At step S814 the procedure determines whether or not there is an entry for the HASH_ID in the CURCALLS lookup table (which is populated during processing of special case messages) and if there is not goes to step S818. If there is an entry for the HASH_ID in the CUR-CALLS lookup table then, at step S816, the procedure reads the CALL_ID for the message from the CURCALLS table (using the CONNECTION_ID as a key) and, at step s818, determines whether the CALL_ID is greater than zero (which will depend upon whether or not the connection identifier has been linked to a positive call identifier). If the call identifier is greater than zero (positive) then at step S820 the procedure writes the call identifier for the message into the sequence state data structure (of FIG. 7b) and the procedure then ends. However if the call identifier is not greater than zero (which implies it is negative) then the procedure determines, at step S822, whether the call identifier is equal to the default value (−1) and if so preferably writes the CALL_ID into the sequence state data structure (S823) and ends. However in the same embodiments untrackable calls may be omitted from the sequence state data structure. If the call identifier is less than −1 (ie negative and not the default value) the procedure checks, at step S824, whether the call identifier has an entry in the negative call identifiers table (NEGATIVE_CALL_ID table of FIG. 7d) and if it does have an entry in the table then, at step s826, the message number of the message is added to the list of messages corresponding to the (negative) call identifier in the negative call identifiers table and the procedure ends. If there is no entry for the (negative) call identifier in the negative call identifiers table then, at step S828, the procedure creates a new entry for the call identifier in the negative call identifiers table including the message number of the message and the procedure then again ends. The message number comprises the sequential number of a packet/message and, in effect, acts as a message identifier.

FIG. 9, which continues from step S806 of FIG. 8a, shows the procedure for processing a message using the NBAP stack protocol. Thus at step S830 the message HASH identifier is set equal to the CRNC_COMMUNICATION_CONTEXT_ID, or equal to the NODEB_COMMUNICATION_CONTEXT_ID if available. These two parameters identify respective ends of a node B-RNC link.

Then at step S834 the procedure identifies four special case messages on the NBAP stack: the Radio Link Setup Request message, the Radio Link Setup Response message, the Radio Link Setup Failure message, and the Radio Link Deletion Response message, these messages being handled by respective procedures as described further below. If the message is not one of the special case messages the procedure continues to step S836, which determines whether the message is one which is common to all mobiles, for example a common measurement report message, and if so sets the call identifier to zero, the procedure then ending. If the message is not a special case message or a common message the procedure continues with the steps of FIG. 8b.

Broadly speaking the call tracking procedure identifies a sequence of 'special' messages using these to allocate a positive call identifier and some temporary, negative, call identifiers which will eventually be linked to a positive call identifier. Messages are logged against a negative call identifier (which could relate to a new call, or to an ongoing call or to a call involved in a handover (handoff) procedure) until a later message allows the negative call identifier to be linked to a positive call identifier (although sometimes, for example where at the start of a logging session a call is ongoing, such a link may not be available). Identifying special case messages also allows messages on the two stacks (NBAP and RRC) to be linked. The sequence of messages for a successfully initiated call is shown in FIG. 5, but the procedure may also use one or more failure cases for housekeeping purposes, for example to reduce the accumulation of redundant and potentially misleading entries in the tables of FIGS. 7c to 7g. The procedures for handling the special case messages will now be described in turn.

Figure 10:
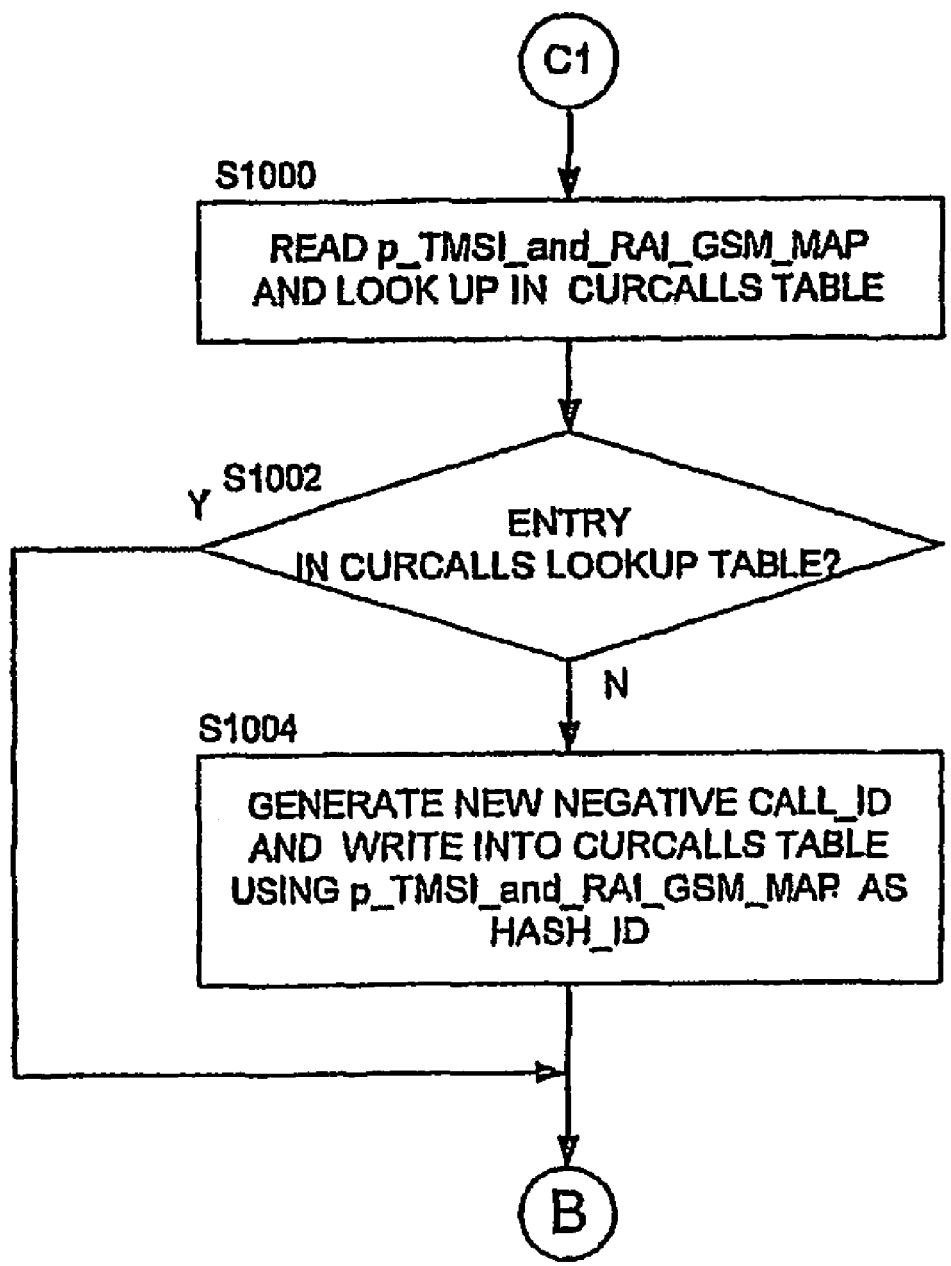
FIG. 10 shows a Connection Request message processing procedure.

FIG. 10 shows a procedure for processing a connection request (RRC) message, which includes a p_TMSI related and/or TMSI related parameter (p_TMSI_and_RAI_GSM_MAP and/or TMSI_GSM_MAP) and an ATM connection identifier (although this connection identifier does not remain constant for later messages). Thus at step S1000 the procedure reads the p_TMSI and/or TMSI related parameter and looks this up in the current calls table (FIG. 7c) to determine, at step S1002, whether or not an entry for this parameter already exists. If an entry already exists the procedure continues with step S812 of FIG. 8b. If there is no entry (ie a new call) at step S1004 the procedure generates a new negative call identifier and writes this into the current call table using the p_TMSI and/or TMSI related parameter as a key, and the procedure again continues at step S812 of FIG. 8b. In one embodiment two counters are provided, one for assigning new positive call identifiers, the other for assigning new negative call identifiers, these counters being respectively incremented and decremented to provide the next available positive/negative number for generating a new positive/negative call identifier. Negative call identifiers begin from less than the default value (−1), for example starting at −10, −11, and so on to distinguish from the default value.

Figure 11:
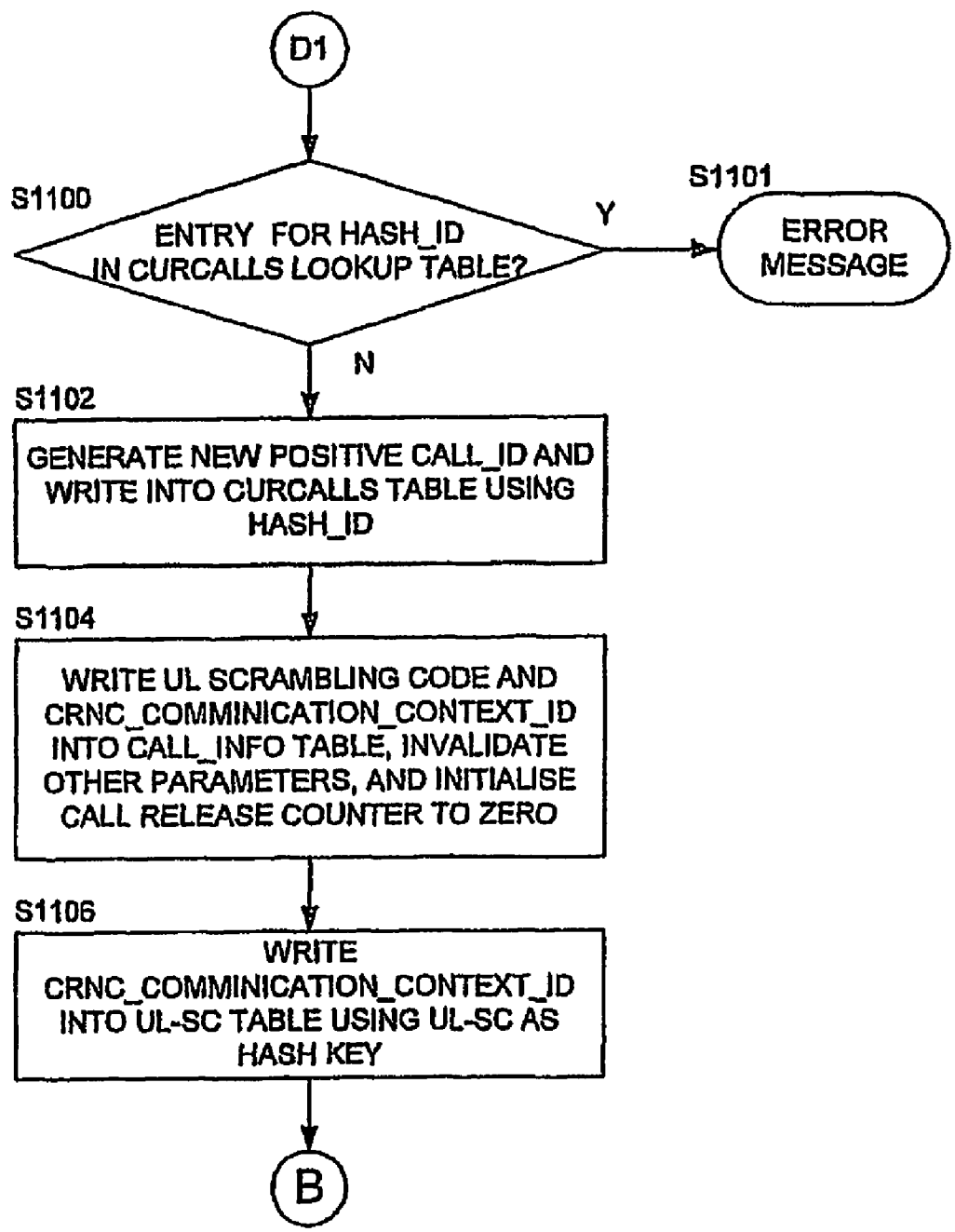
FIG. 11 shows a Radio Link Setup Request message processing procedure.

FIG. 11 shows a procedure for processing a Radio Link Setup Request message (NBAP), this message including a CRNC identifier (in particular the CRNC Communication Context Identifier) and a (UL) scrambling code (SC). The downlink (DL) SC is associated with the base station and the uplink (UL) SC with the mobile station. Thus at step s1100 the procedure checks for an entry in the current calls table for the HASH_ID for the message (at step S830 set equal to the CRNC communication context identifier). If there is already an entry, for example in the unlikely event that some old data has not been properly cleared, an error message is generated (step S1101). If there is no entry, at step S1102 the procedure generates a new positive call identifier (for example the next available positive number) and writes this into the current calls table using the CRNC communication context identifier as the key (generating entry +M shown in FIG. 7c). Likewise using the CRNC communication context identifier as a key the procedure then writes the uplink scrambling code and CRNC communication context identifier into the call information data structure of the call information table using the CRNC communication context identifier as a key, invalidating (ie clearing) other parameters in the call information data structure, and initialising the call release counter (in the call information table) to zero (step 1104). Then, at step S1106, the procedure writes the CRNC communication context identifier into the scrambling code table (FIG. 7e) using the (UL) scrambling code as a key, and the procedure then continues with step S812 of FIG. 8b.

Figure 12:
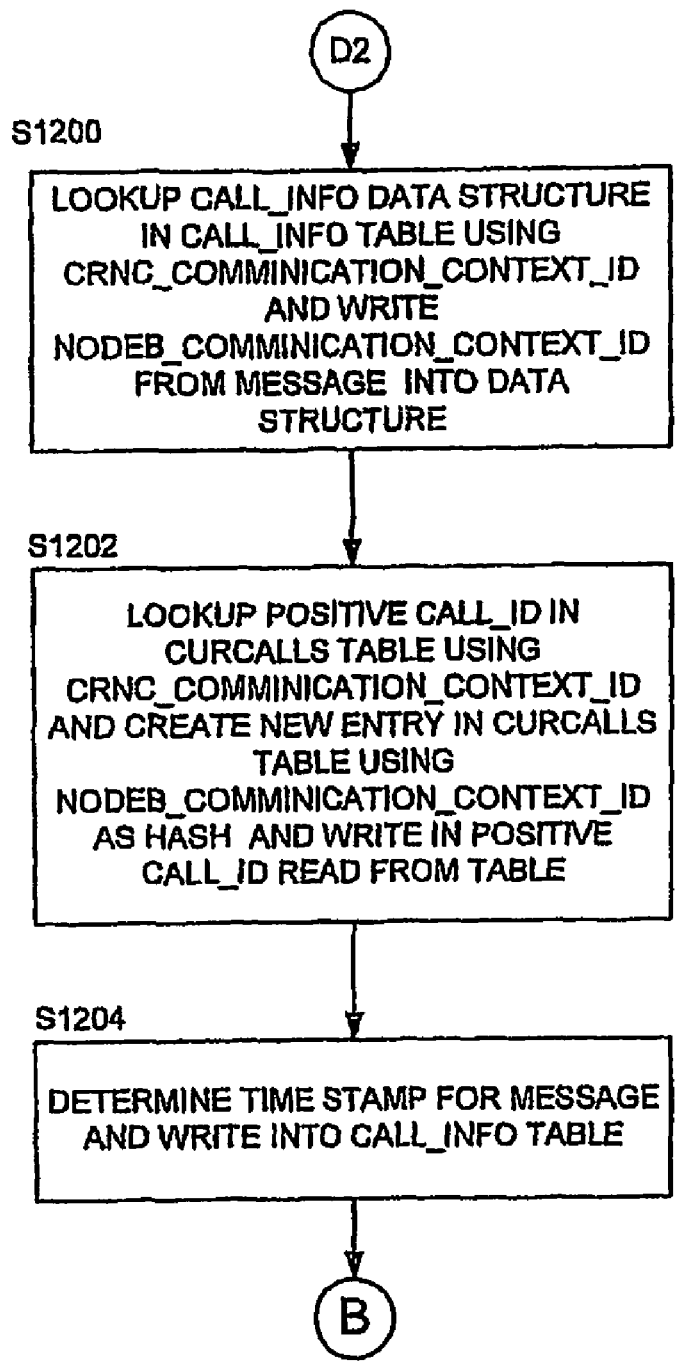
FIG. 12 shows a Radio Link Setup Response message processing procedure.

FIG. 12 shows a procedure for processing a radio link setup response message (NBAP), this message including both a CRNC communication context identifier and a Node B identifier, and thus allowing the positive call identifier allocated when processing the radio link setup request message to be linked to the Node B identifier.

Thus at step S1200 the procedure uses the CRNC communication context identifier from the message to look up in the call information table (FIG. 7f) and retrieve the relevant call information data structure, into which is written the Node B identifier from the message. Then at step S1202 the procedure looks up in the current calls table (FIG. 7c) using the CRNC communication context identifier to read the positive call identifier (+M) and creates a new entry in this table using the Node B identifier as a HASH, writing in this positive call identifier (+M). The procedure then preferably determines a time stamp for the message, for example by reading a current time, and writes this time stamp into the call information data structure in the call information table for the message. This allows the time at which the radio channel was set up to be determined, in effect starting a timer to allow a call duration to be determined. The procedure then again continues with step S812 of FIG. 8b.

Figure 13:
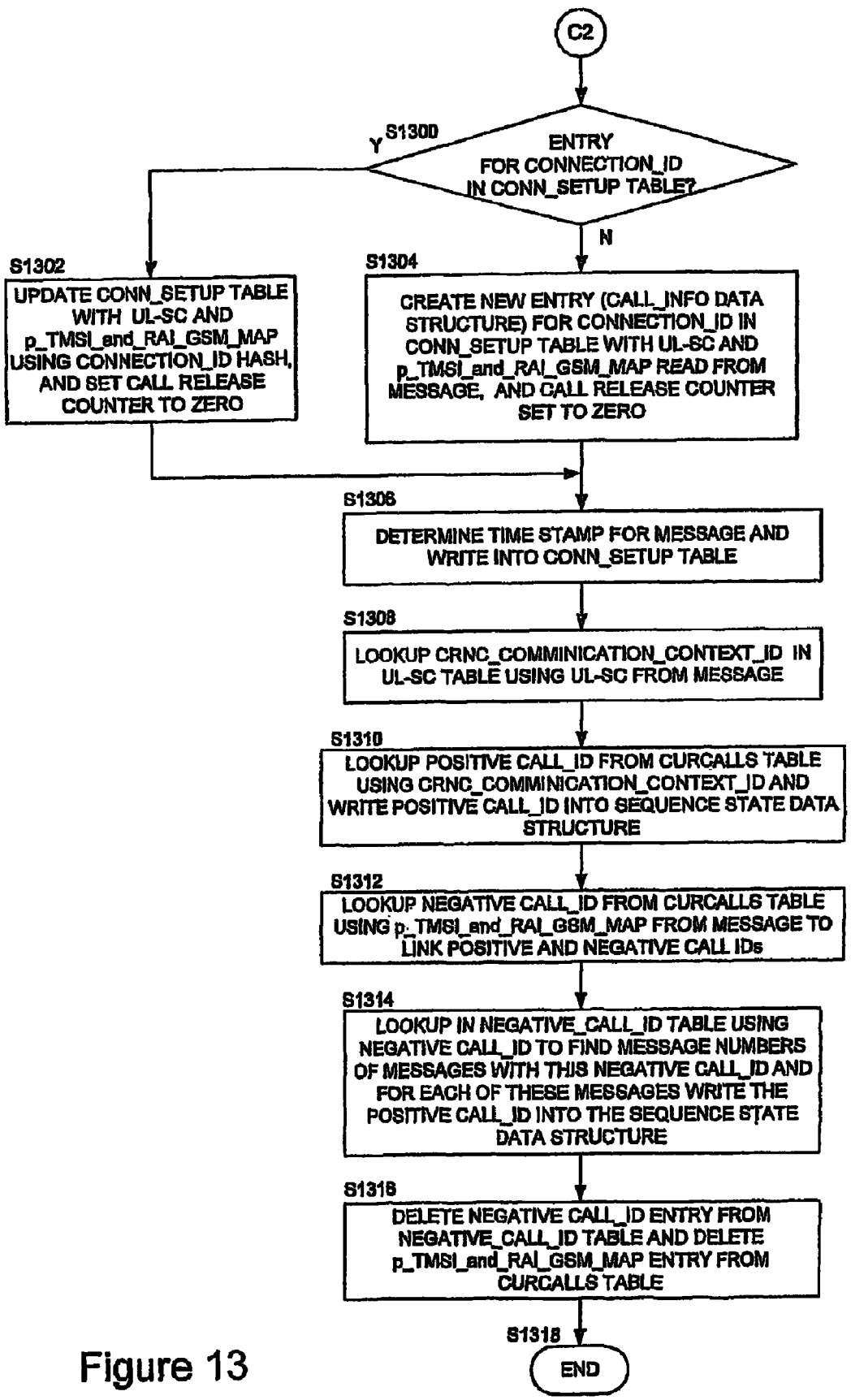
FIG. 13 shows a Connection Setup message processing procedure.

FIG. 13 shows a procedure for processing a connection setup message (RRC), this message including both the p_TMSI and/or TMSI related parameter of the connection request message and the scrambling code (SC) of the radio link setup request message, thus linking the NBAP and RRC stacks and linking the positive call identifier (allocated for the radio link setup request message) to the negative call identifier (allocated at the RRC connection request message processing stage).

At step S1300 the procedure checks for an entry in the connection setup table (FIG. 7g) using the connection identifier (VPI, VCI and CID) as a HASH. If an entry is present the procedure uses the connection identifier to update the corresponding call information data structure with the scrambling code and p_TMSI_and_RAI_GSM_MAP (the call release counter is also initialised to zero here). If no entry is present then, at step S1304, the procedure creates a new entry, that is a new call information data structure, for the connection identifier in the connection setup table and writes into the call information data structure the scrambling code and p_TMSI and/or TMSI related parameter values read from the message and sets the call release counter in this table to zero (this is, in effect, a spare parameter, unused in the presently described embodiment, which may be taken into account in applications needing particular call release robustness). Then, for both cases, at step S1306 the procedure continues and determines a time stamp for the message, for example by reading a current time (for the message), and writes this into the call information data structure of the connection setup table of FIG. 7g. Step S1306 is optional, depending upon whether or not time-based linking of messages is employed, although such time-based linking is currently required for the tracking of calls employing the Nokia variant of the NBAP protocol stack and messages.

At step S1308 the procedure uses the uplink scrambling code from the message to access the scrambling code table (FIG. 7e) to determine the CRNC communication context identifier associated with the scrambling code and then, at step S1310, this CRNC communication context identifier is used to access the current calls table (FIG. 7c) to determine a positive call identifier (+M) for the message; this is then written into the sequence state data structure, preferably effectively calling the procedure of FIG. 8b as a subroutine (returning to step S1702) to write the CALL_ID into the sequence state data structure. The procedure of FIG. 8b (starting at S812) is preferably employed to handle cases where the Connection Setup message is found without a complete sequence of messages leading up to it. At step S1312 the p_TMSI and/or TMSI related parameter is also used as a key for the current calls table to look up a negative call identifier (−N2), to link positive and negative call identifiers. Then a procedure which will be termed 'retrosetting' call identity is implemented.

To retroset call identifiers, at step S1314 the procedure looks up in the negative call identifiers table (FIG. 7d) using the negative call identifier (−N2) from the current calls table, to find a list of message numbers for messages associated with this negative call identifier and, for each of these messages, the procedure writes the positive call identifier (corresponding to the negative call identifier) into the sequence state data structure. Then, at step S1316, the negative call identifier entry is deleted from the negative call identifiers table and the p_TMSI and/or TMSI related parameter entry is deleted from the current calls table by way of housekeeping, to reduce the risk of looking up an incorrect call identifier at a later stage. The procedure then ends at step S1318.

Figure 14A:
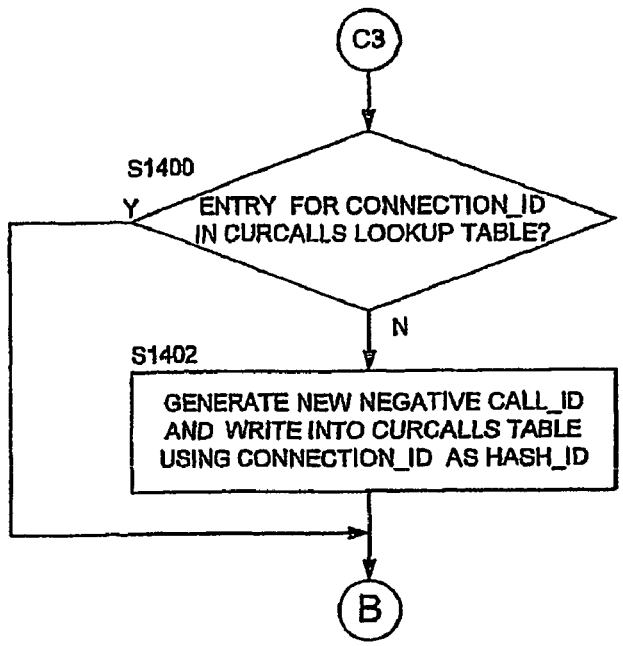
FIGS. 14a and 14b show alternative Connection Setup Complete message processing procedures.
Figure 14B:
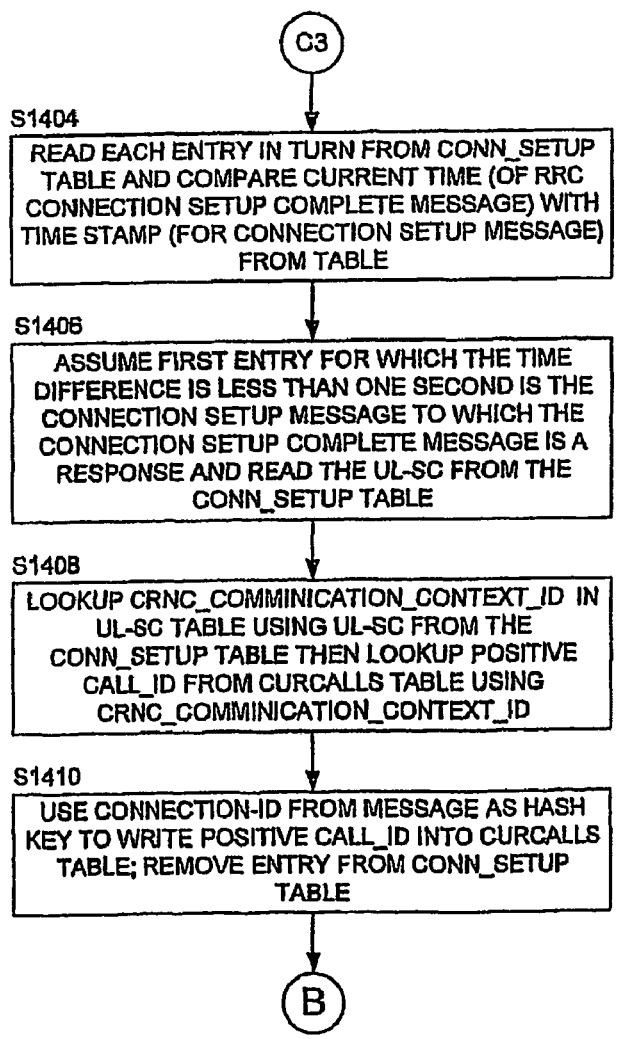

FIGS. 14a and 14b show two alternative procedures for processing a connection setup complete (RRC) message, depending upon whether or not time-based message linking is employed. The connection setup complete message includes a connection identifier (VPI, VCI, CID) which, eventually, can be linked to a positive call identifier via the radio bearer setup message. However this link is not present in the case of a Nokia NBAP stack in which case time-based linking may be employed to directly link the connection setup complete message with the previous connection setup message to which it is a response, thus directly obtaining a positive call identifier for the message.

FIG. 14a shows a procedure when time-based message linking is not employed. This procedure first checks, at step S1400 for an entry for the connection identifier for the message in the current calls lookup table and if one is found proceeds to step S812 of FIG. 8b. If none is found then, at step S1402, a new negative call identifier is generated and written into the current calls table using the connection identifier for the message as the HASH key (−N1 in FIG. 7c); the procedure then continues with S812 of FIG. 8b.

In the variant of FIG. 14b at step S1404 the procedure reads each entry in turn from the connection setup table (FIG. 7g) and compares the current time (that is the time of the RRC connection setup complete message) with the time stamp read from the call information data structure, that is with the time of the connection setup message (it will be appreciated that here, as elsewhere, the 'current' time refers to the current time of the message rather than the time of actually processing the message since in many cases the message will be processed offline sometime after capture). The procedure assumes that the first entry found in the connection setup table for which the time difference between the connection setup message and the connection setup complete message is less than a predetermined value (in embodiments one second) comprises an entry for a connection setup message to which the message being processed is a response. Thus once an entry in the connection setup table to which the present message is a response has been identified the scrambling code is read from the call information data structure of the connection setup table and this is used to access the scrambling code table (FIG. 7e) to determine a CRNC communication context identifier, which in turn is used to look up a positive call identifier in the current calls table (FIG. 7c) (steps S1406, 1408). Then, at step S1410 this positive call identifier is written into the current calls table using the connection identifier for the connection setup complete message as a key and the now obsolete entry can now be removed from the Correction Setup table. The procedure then continues with S812 of FIG. 8b. This links messages on the RRC stack to a positive call identifier without the need for interception of a radio bearer setup message. It will be appreciated that such time-based linking may also be employed to link other pairs of messages, in particular request-response messages.

Figure 15:
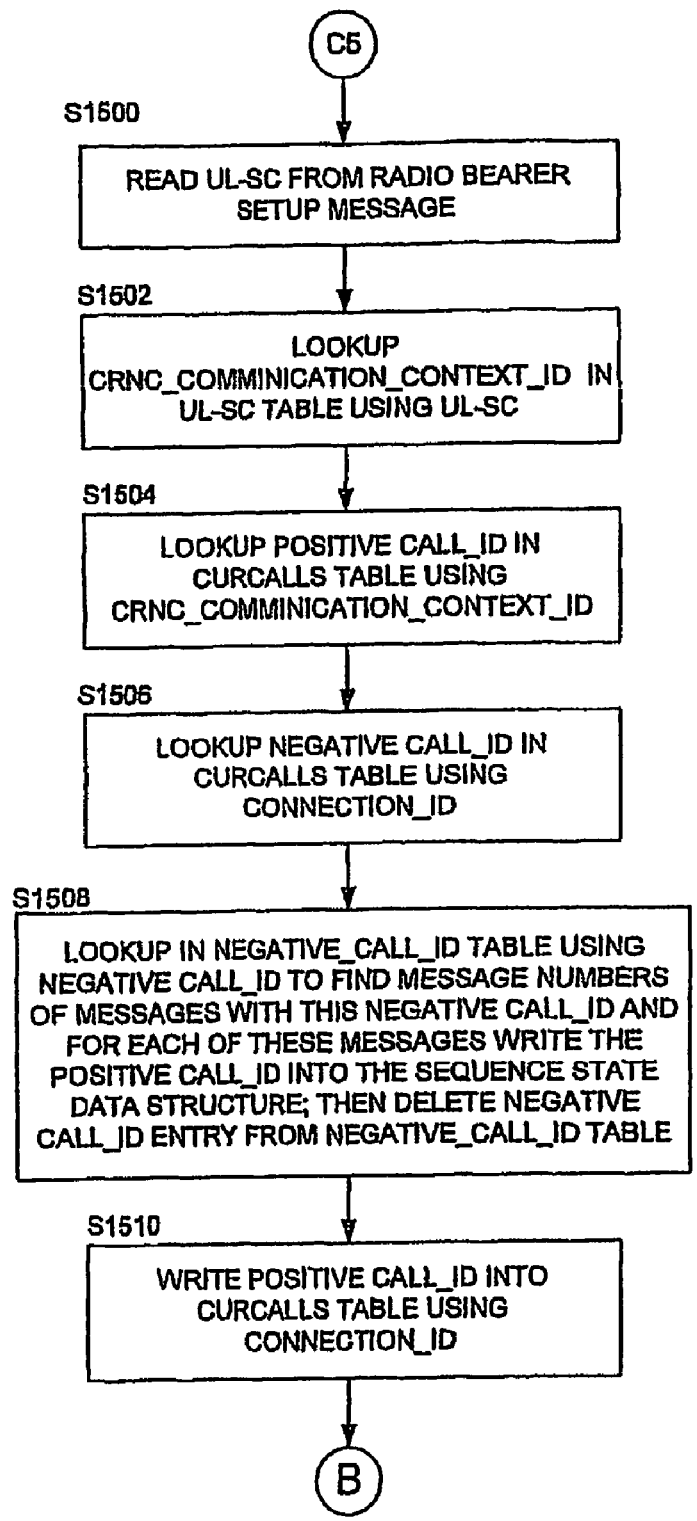
FIG. 15 shows a Radio Bearer Setup message processing procedure.

FIG. 15 shows a procedure for processing a Radio Bearer Setup (RRC), this message including both a scrambling code and a connection identifier (for ATM). The scrambling code may be used to link the connection identifier to a previously generated positive call identifier, and since from this point onwards the connection identifier does not change subsequent messages may also be linked to the same positive call identifier. This message again in effect links the RRC and NBAP stacks via the uplink scrambling code, the UL-SC being unique to a call from a mobile station.

At step S1500 the procedure reads the UL-SC from the Radio Bearer Setup message and, at step S1502 uses this to look up in the UL-SC table (FIG. 7e) to determine a CRNC communication context identifier. This CRNC communication context identifier is then used to access the current calls table to determine a positive call identifier (+M), and at step S1506 the connection identifier (VCI, VPI, CID) for the message is used to look up a negative call identifier, also in the current calls table. The procedure then retrosets call identifiers at step S1508, looking up in the negative call identifiers table using the negative call identifiers to find message numbers for messages with this negative call identifier and, for each of these messages, writing the positive call identifier from the current calls table into the sequence data structure. The entry for the negative call identifier is then deleted from the negative call identifiers table. Then at step S1510 the positive call identifier is written into the current calls table using the connection identifier for the message as a HASH key, and the procedure then continues with S812 of FIG. 8b.

Figure 16:
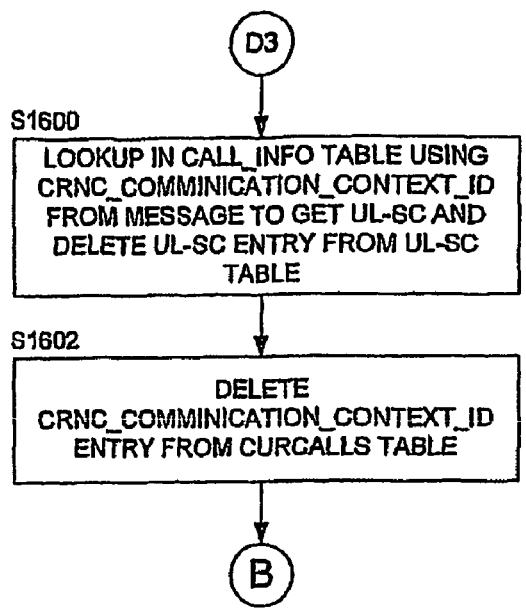
FIG. 16 shows a Radio Link Setup Failure message processing procedure.

FIG. 16 shows a procedure for processing a Radio Link Setup Failure message (NBAP). The aim of this procedure is mainly to remove data which could cause the call tracking procedure to latch onto an incorrect (ie failed) call. Thus at step S1600 the procedure uses the CRNC communication context identifier from the message to look up in the call information table (FIG. 7f) to determine the uplink scrambling code and then deletes the entry for this scrambling code from the uplink scrambling code table (FIG. 7e). Then, at step S1602, the entry for the CRNC communication context identifier in the current calls table is also deleted and the procedure continues with S812 of FIG. 8b.

Figure 17:
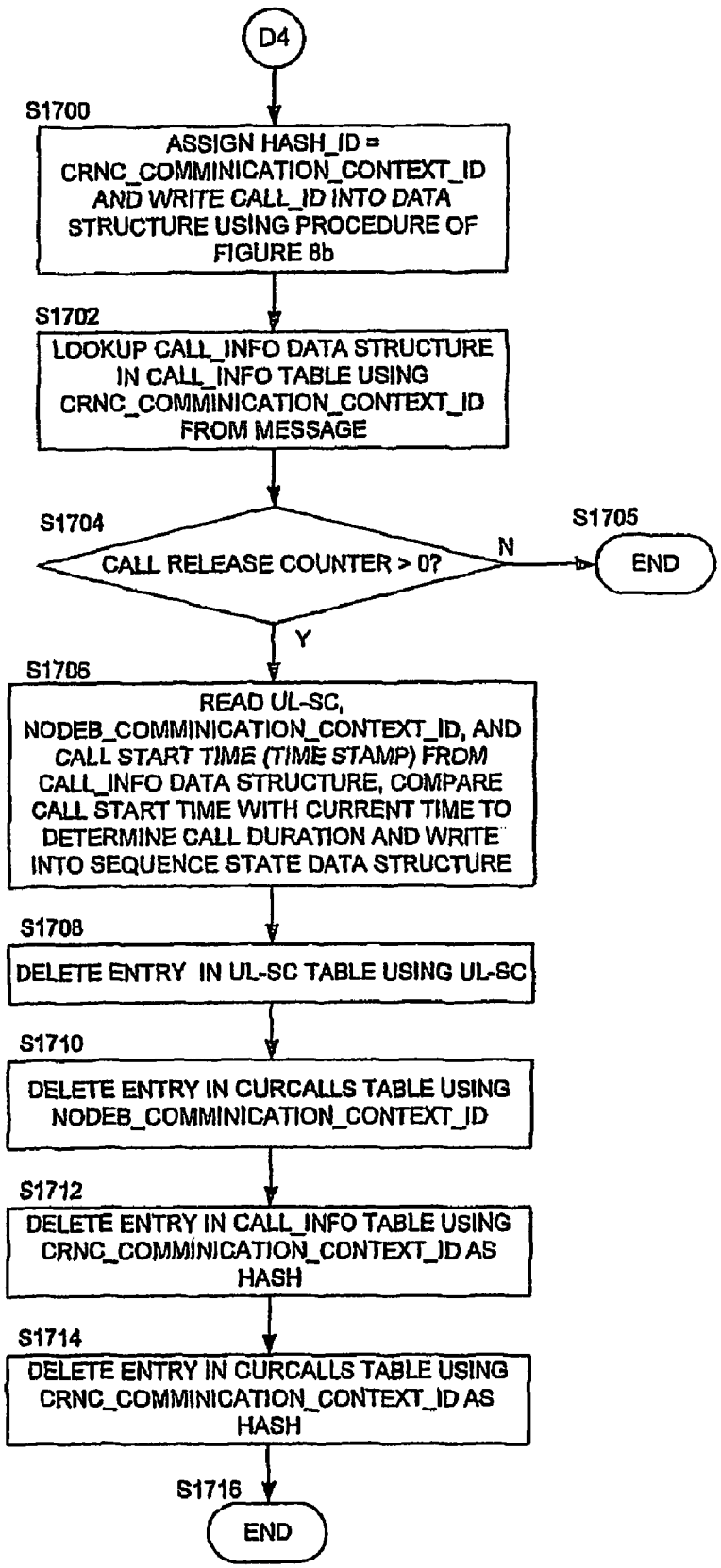
FIG. 17 shows a Radio Link Deletion Response message processing procedure.

FIG. 17 shows a procedure for processing a Radio Link Deletion Response message (NBAP) which effectively comprises an end call message between the Node B and RNC on the NBAP stack. However since the message could also be the result of a handover an effective link to an uplink Direct Transfer message is created so that the end call procedure is effectively only implemented when confirmation of a call release has previously been received, in particular at the NAS (non-access stratum) level.

At step S1700 the procedure assigns the HASH key variable to the CRNC communication context identifier from the message and then effectively calls the procedure of FIG. 8b as a subroutine (returning to step S1702) to write the CALL_ID into the sequence state data structure. The procedure of FIG. 8b (starting at S812) is preferably employed to handle cases where the Radio Link Deletion Response message is found without a complete sequence of messages leading up to it.

At step S1702 the procedure then looks up in the call information table (FIG. 7f) using the CRNC communication context identifier, to read the corresponding call information data structure, then checking, at step S1704, whether the call release counter (from this call information table) is greater than zero—that is whether it has previously been incremented (see procedure of FIG. 18 below). If the call release counter is not greater than zero the procedure ends at step S1705, otherwise the procedure continues.

Where a call release message has previously been received the procedure, at step S1706, reads the call information data structure from the call information table (or map), using the CRNC communication context identifier, to determine the uplink scrambling code, Node B identifier, and call start time (from the time stamp). The procedure then compares the call start time with the current time (for the message) to determine the call duration and writes this (for example as a parameter for the message) into the sequence state data structure. Then, at step S1708, the procedure deletes the entry for the uplink scrambling code in the uplink scrambling code table (FIG. 7e), at step S1710 deletes the entry for the Node B identifier in the current calls table, at step S1712 deletes the entry for the CRNC communication context identifier in the call information table (FIG. 7f), and at step S1714 deletes the entry for the CRNC communication context identifier in the current calls table; the procedure then ends at step S1716. A similar housekeeping procedure may be employed at intervals, based upon the call start time stamp, for example to clean up entries which have not been matched after a predetermined time interval.

Figure 18:
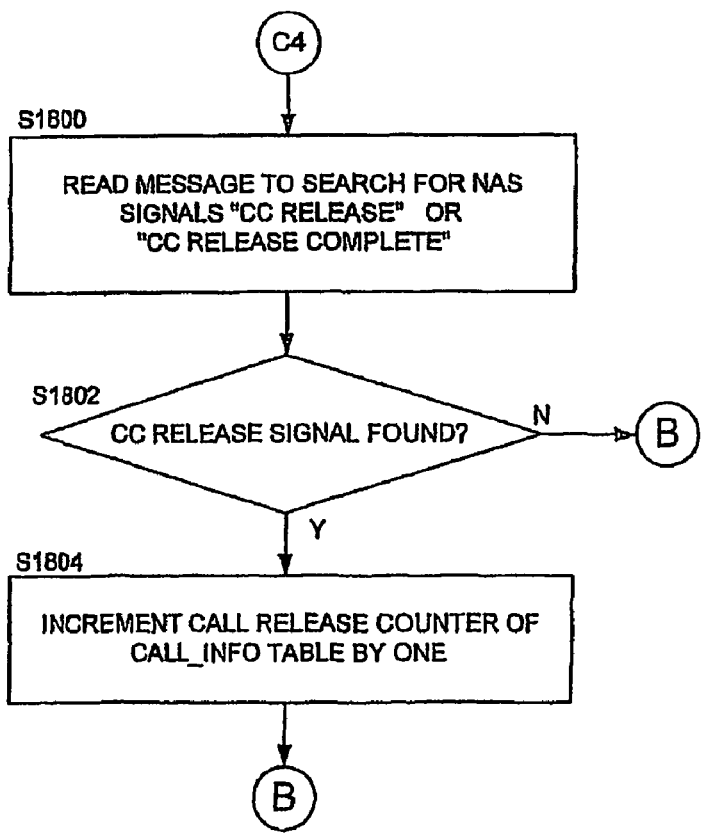
FIG. 18 shows a Direct Transfer message processing procedure.

FIG. 18 shows a procedure for processing a UL (uplink) Direct Transfer message (RRC). At step S1800 the procedure reads the uplink Direct Transfer message to determine whether this message includes a Call Release message, in particular either of the NAS (non-access stratum) call control messages CC Release, and CC Release Complete. For example a call may be released if a party to the call presses an 'end of call' button on their mobile station and these messages help to positively identify the end of a call rather than, say, a handover to another area or release for some other reason. Thus at step S1802 the procedure checks whether either of these two signals are present; if not the procedure continues with S812 of FIG. 8b but otherwise, if such a message is found, incrementing the call release counter of the call information data structure of the call information table by one (accessing this, for example, using a Connection Identifier (Connection_Id) from the message; then the procedure continues with S812 of FIG. 8b.

Figure 19:
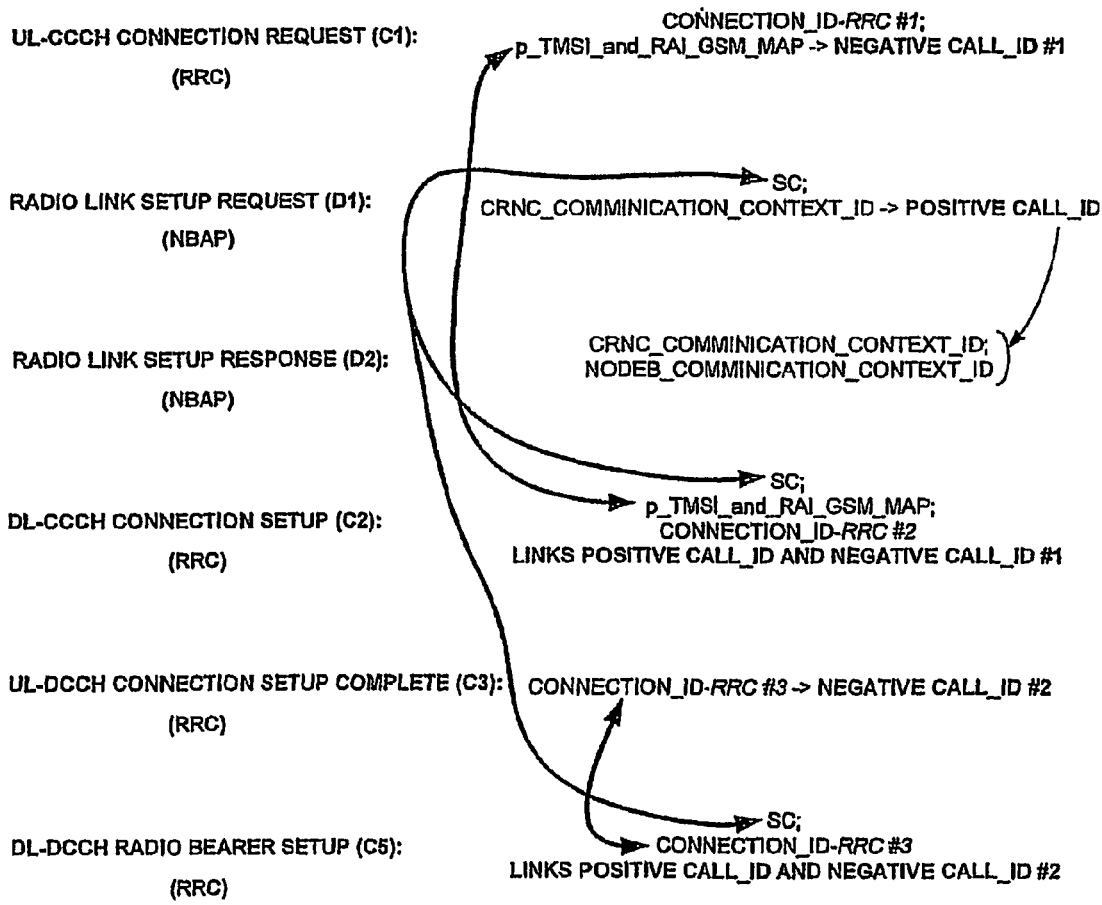
FIG. 19 shows a overview of a call tracking procedure according to an embodiment of the present invention.

FIG. 19 summarizes the above described procedure. There are two stacks, the RRC stack and the NBAP stack; parameters in the RRC stack include the scrambling code (unique to an MS call), the TMSI_GSM_MAP and/or p_TMSI_and_RAI_GSM_MAP (which identifies the MS), and the ATM connection identifier VCI, VPI, CID (which for the RRC stack is call specific at a later stage but which changes, for example, when changing channels). The NBAP stack also includes the scrambling code (thus linking the two stacks) as well as CRNC and Node B identifiers and an NBAP stack ATM connection identifier (although this does not generally change very much between different calls).

Referring now to the messages, the initial RRC connection request provides the p_TMSI parameter which is used to generate a negative call identifier. The NBAP Radio Link Setup Request provides both the (uplink) scrambling code and the CRNC communication context identifier, the latter being used to generate a positive call identifier. The NBAP radio link setup response message includes identifiers for both the CRNC and Node B and thus links the two directions of the NBAP stack. The RRC Connection Setup message includes both the p_TMSI parameter and the (uplink) scrambling code as well as a connection identifier and can thus be used to link the negative call identifier from the connection request message with the positive call identifier (the scrambling code linking to the CRNC communication context identifier). Thus messages with the negative call identifier can be allocated the corresponding positive call identifier. The time of the RRC Connection Setup message may also be logged for time-based linking. The RRC Connection Setup Complete message has a (RRC) connection identifier which is used to generate a second negative call identifier; alternatively the time of this message may be compared with the time of previous Connection Setup messages to determine the closest (and/or to identify a message within a predetermined interval) to link this to a previous Connection Setup message and hence to a positive call identifier. The RRC Radio Bearer Setup message includes both the RRC connection identifier and the (UL) scrambling code (also called the "long SC" as it is longer than the DL SC) and may therefore be used to link the connection identifier to a positive call identifier. In particular the scrambling code may be used to determine a CRNC communication context identifier, which in turn determines the positive call identifier, and the connection identifier determines the (second) negative call identifier.

There are some messages between the Connection Setup Complete message and the Radio Bearer Setup message, for example security mode commands, measurement control messages, initial direct transfer messages (which may respond with the IMEI—International Mobile Equipment Identity—of the MS) and other messaging for example relating to the kind of service which is requested. However these messages are optional and therefore are preferably not relied upon for linking messages when call tracking. Once the negative call identifiers for these messages have been linked to a positive call identifier the negative call identifiers may be replaced by the positive call identifier as before. Generally all subsequent messages on the RRC stack will then have the same connection identifier (VCI, VPI, CID) which then links directly to a positive call identity. Finally (not shown in FIG. 19) a call shuts down and then housekeeping is performed on the various tables of FIGS. 7c to 7g to remove data which is no longer needed. The procedure of FIG. 8 fires for each message to gradually assign and resolve call identifiers in accordance with the procedure of FIG. 19 until, as so far as is possible, a positive call identifier can be allocated to each message.

Broadly speaking the Radio Link Setup Request and Radio Bearer Setup messages are particularly important. Broadly speaking the connection identifiers of the dedicated control channel (DCCH) messages are of more use than those of the common control channel (CCCH) messages.

It is helpful to illustrate the mechanism of FIG. 19 using some parameters from actually captured data. Thus in one example the Connection Request had a connection identifier of {0, 65, 28} and a p_TMSI parameter of −1057750568 (this is, in fact, a two's complement representation of the actual binary value, which may be obtained by converting back from this number). The Radio Link Setup Request had a CRNC communication context identifier of 69258, a scrambling code of 2114779 and a connection identifier (NBAP) of {0, 38, 0}. Many links use this identifier so that same the connection identifier can access a plurality of mobile stations, and as this is unreliable for identifying messages as belonging to a particular call instead the CRNC/Node B identifiers are employed). It is interesting to note that the next Radio Link Setup Request message in the sequence of captured messages had a CRNC communication context identifier of 69259, and therefore was assigned a new positive call identifier.

The Radio Link Setup Response message had a connection identifier of {0, 38, 0,} a CRNC communication context identifier of 69528 and a Node B identifier of 112 (at this point there were many previous Radio Link Setup Requests and a link was made to the one which matched the CRNC communication context identifier). The Connection Setup message had a scrambling code of 2114779 and a p_TMSI (in two's complement format) of −1057750568; in another example, however, this message was missed. The Connection Setup Complete message had a connection identifier of {0, 65, 203} and the radio bearer setup message had a scrambling code of 2114779 and, again, a connection identifier of {0, 65, 203} (this latter connection identifier remains constant until a change of channel and/or handover).

Figure 20:
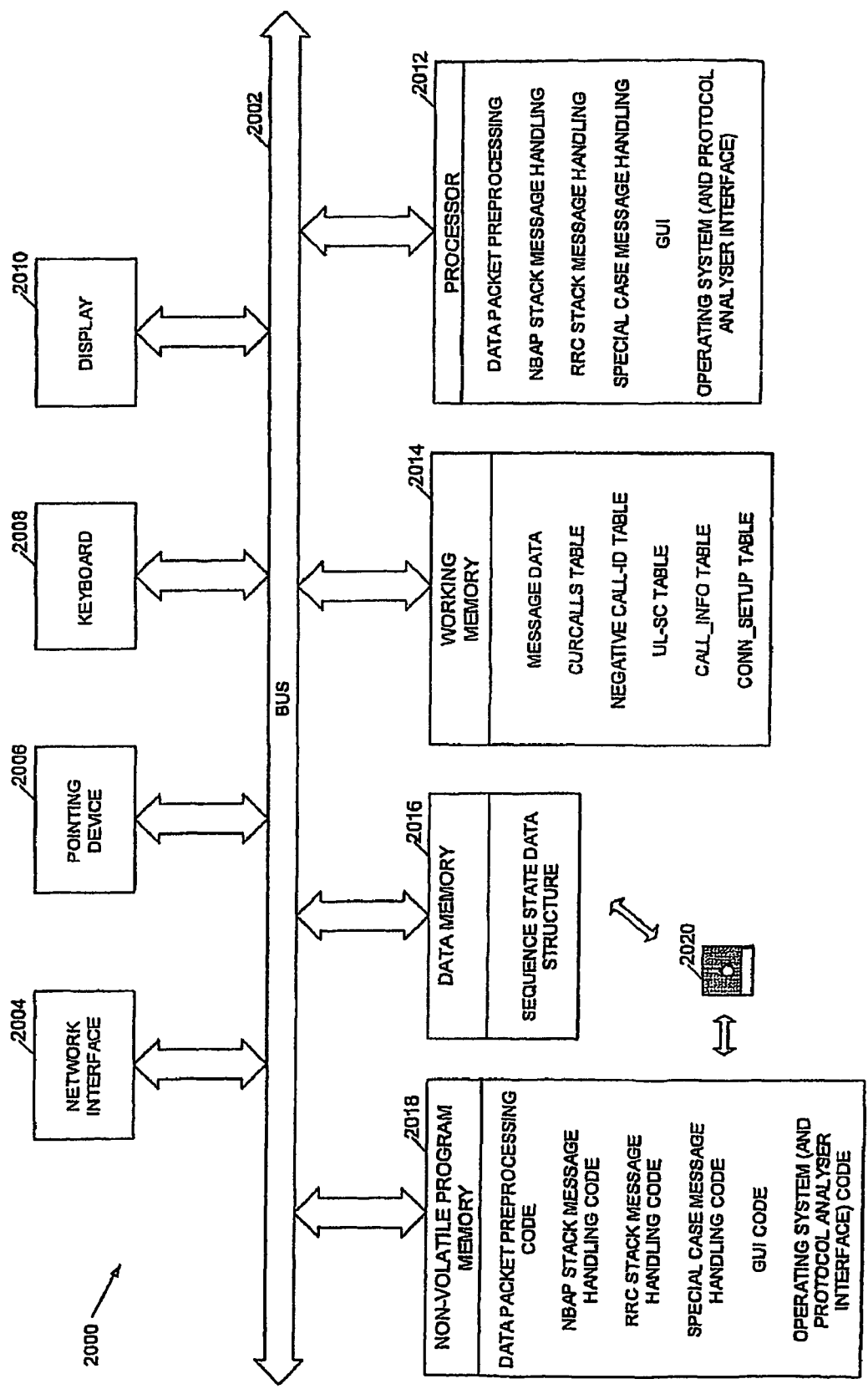
FIG. 20 shows a computer system suitable for implementing an embodiment of the present invention.

FIG. 20 shows a block diagram of a general purpose computer system 2000 implementing an embodiment of the above described techniques. The computer may comprise any general purpose computer, for example a laptop or desktop system running, say, Windows (trademark). The above described procedures may be implemented in any conventional programming language, for example Visual C++. The computer 2000 comprises a data and address bus 2002 to which are connected a network interface 2004, for example for interfacing to a protocol analyser, a pointing device 2006 such as a mouse, a keyboard 2008, and a display 2010. Non-volatile program memory 2018 stores code for implementing the above described procedures, for example, data packet preprocessing code, NBAP stack message handling code, RRC stack message handling code, special case message handling code, graphical user interface (GUI) code, operating system code, and, if necessary, code for interfacing to a protocol analyser. Volatile or non-volatile data memory 2016 may be employed to store the sequence state data structure. Working memory 2014 stores the message data and the various tables of FIGS. 7c to 7g, in particular the current calls table, the negative call identifiers table, the uplink scrambling code table, the call information table, and the connection setup table. The program memory 2018, non-volatile data memory 2016, working memory 2014 are all coupled to bus 2002 and a processor 1012 is also coupled to the bus to load an implement code from the permanent program memory. As illustrated the processor implements the code to provide data packets preprocessing, NBAP stack message handling, RRC stack message handling, special case message handling, a graphical user interface, and operating system and optionally, a protocol analyser interface. The non-volatile program memory and/or non-volatile data memory may comprise storage such as a hard disk and/or some or all of the contents of this memory may be provided on portable storage media such as a CD-ROM, illustratively shown by floppy disk 2020.

Figure 21:
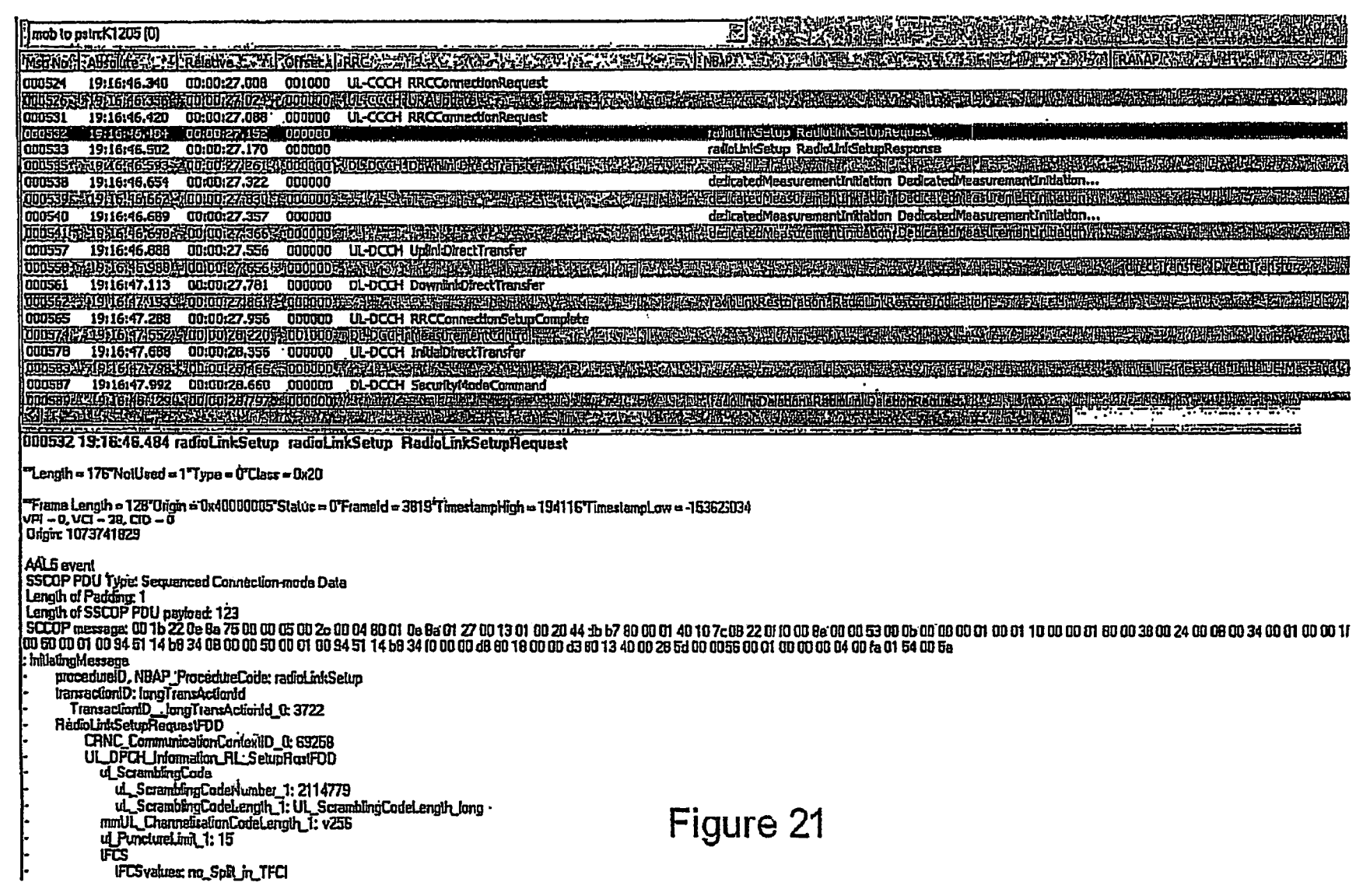

FIG. 21 shows an example of text output from the call tracking procedure. The highlighted Radio Link Setup Request message is that used for the example described with reference to FIG. 19 and, in particular, it can be seen that VPI=0, VCI=38, CID=0, CRNC_CommunicationContextID_0=69258 and uL_ScramblingCodeNumber_1=2114779.

Figure 22:
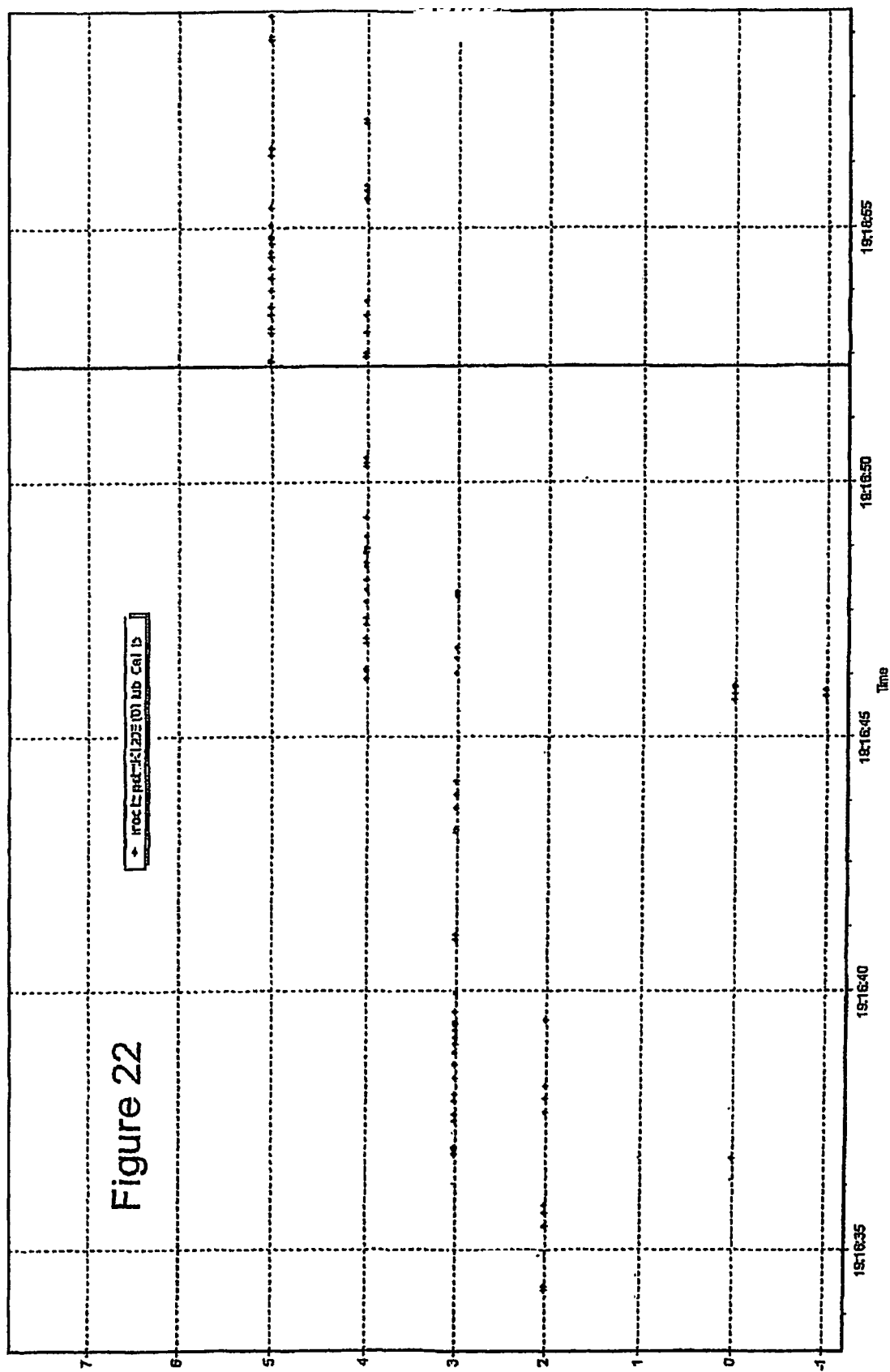
FIG. 22 shows an example of a graphical output from an embodiment of the present invention.

FIG. 22 shows an example of graphical output from the call tracking procedure, in which call identifiers are shown on the y-axis and time is shown on the x-axis, messages being indicated by points on the display (hovering a cursor over a point bringing up further information about the message). It can be seen that there are two messages with call identifier of −1 which means that these messages cannot be tracked, for example because messages were collected from a point during the call where key information had been missed. Some messages with a call identifier of 0, implying a common message, are also shown. Five calls have been identified and messages for calls 2 to 5 are depicted.

The skilled person will recognise that variants on the above described procedure are possible. For example it may be desirable to track a call as it is handed over from one cell to another. To follow a handover (or handoff) data is captured from two Iub interfaces, one for the RNC-Node B pair from which the call is being handed over, and one for the RNC-Node B pair to which the call is being handed over. The DL scrambling code is different for each Iub interface but once the call is tracked on one interface the new scrambling code can be determined because the network sends a message to a mobile station at handover instructing the mobile station to attach to a new Node B using a specified scrambling code (the NBAP Radio Link Addition message; there is also a Radio Link Removal message). A very short time afterwards a corresponding Radio Link Setup Request is seen on the Iub interface for the new Node B, on the NBAP stack, and this message can be identified using a time-based linking method similar to that described above for the RRC Connection Setup/Connection Setup Complete messages, and/or by looking for a Radio Link Setup Request message including the new but known scrambling code. Also associated with the hand over are messages on the RRC stack, Active Set Update and Active Set Complete/Failure and, again, these can be identified using the above described techniques.

Figure 1:
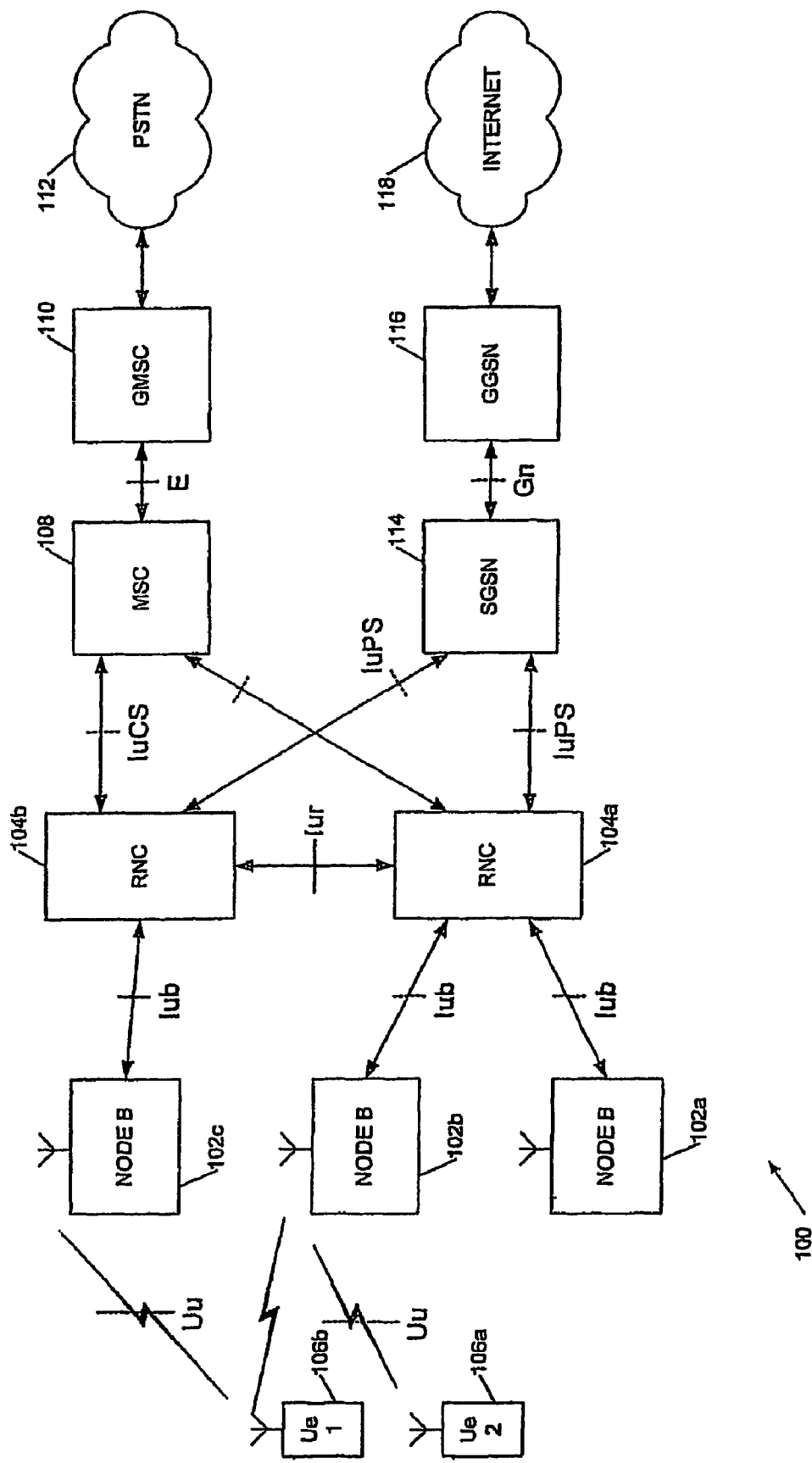
FIG. 1 shows a portion of a UMTS mobile phone network.

Referring back to FIG. 1, similar techniques to those described above may be employed to track calls in data captured from other interfaces. For example virtually the same techniques as those described above for the Iub interface may be employed to track calls on the Iur interface as the Iur interface is very similar to the Iub interface, essentially just redirecting information from an Iub interface into the next RNC.

Tracking calls on a circuit or packet switched Iu interface is considerably more straightforward than tracking calls on the Iub interface. Thus at the Iu interface each message has either one or other of a Source Local Reference (SLR) and Destination Local Reference (DLR), which serve similar functions to the CRNC and Node B identifiers described above. Thus a single table may be employed to link an SLR to a DLR and, optionally, to a connection identifier (VPI, VCI, CID).

Generally in the above described techniques data for calls made by a single mobile station captured (for example simultaneously) at the Iub and Iu (IuCS or IuPS) interfaces, are given different call identifiers. However these may be linked so that both have the same Call_Id, for example using a TSMI or p_TMSI related parameter or an IMEI/IMSI—related parameter or a Call Party Number—related parameter. This allows call data captured at two interfaces, for example at different levels within a network, to be associated.

Embodiments of the invention have been described with specific reference to a UMTS network but applications of embodiments of the invention are not limited to this type of network and may be employed in other mobile phone networks and/or networks more frequently thought of as computer data networks, where these have communication sessions or calls to be identified by intercepting packets at an interface (internal or external) of the network. This might apply, for example, to VoIP (Voice over Internet Protocol) calls.

No doubt many other effective alternatives will occur to the skilled person. It will be understood that the invention is not limited to the described embodiments and encompasses modifications apparent to those skilled in the art and within the spirit and scope of the claims appended hereto.

The invention claimed is:

1. A method of identifying messages, which are associated with a particular communications session, in a stream of messages, which are captured from an interface within a network and comprise user data and network signalling data, the network including a fixed station in wireless communications with a plurality of mobile stations, said particular communications session being associated with one of said mobile stations and said stream of messages including messages for a plurality of communications sessions, the method comprising:

inputting a portion of said stream of messages;

reading network signalling data from said messages of said inputted stream, said signalling data including a plurality of network signalling parameters;

assigning a first session identifier to at least one message having a first one of said network signalling parameters, said at least one message being one of said messages of said inputted stream;

assigning a second session identifier to at least one message having a second one of said network signalling parameters, said at least one message being one of said messages of said inputted stream;

identifying a message having both said first and said second signalling parameters;

using said identified message having both said first and second signalling parameters to link said at least one message having said first session identifier and said at least one message having said second identifier to identify messages of said particular communications session; and identifying said linked messages of said particular communications session by allocating a common identifier to said linked messages.

2. A method as claimed in claim 1 wherein a said message having said second signalling parameter also has a third signalling parameter; and wherein said assigning of said second session identifier associates said second session identifier with said third signalling parameter.

3. A method as claimed in claim 2 further comprising assigning said second session identifier to at least one other of said messages also having either said second or said third signalling parameter.

4. A method as claimed in claim 1 further comprising assigning said first session identifier to at least one other message also having said first signalling parameter.

5. A method as claimed in claim 1 wherein messages captured at said interface conform to one of two protocol stacks; and wherein said first session identifier is associated with messages according to a first of said protocol stacks and said second session identifier is associated with messages according to a second of said protocol stacks.

6. A method as claimed in claim 1 further comprising:

assigning a third session identifier to a message having a fourth signalling parameter;

identifying a message having both said second and fourth signalling parameters; and identifying messages of said communications session by linking said messages having said second and third session identifiers using said message having both said second and fourth signalling parameters.

7. A method according to claim 1 further comprising assigning a said session identifier to a message responsive to a time interval between the message and an associated message being less than a threshold value, one of the message and the associated message being responsive to the other of the message and the associated message.

8. A method according to claim 1 wherein said network comprises a UMTS network, wherein said first signalling parameter comprises ATM routing information or a TMSI related signal, and wherein said second signalling parameter comprises a scrambling code related parameter.

9. A method as claimed in claim 1 further comprising providing a data structure comprising a sequence of entities, each entity corresponding to a said message and including, for messages of said identified communications session, a common communications session identifier.

10. A method of processing messages of a stream of messages captured from an interface within a network, the method comprising allocating, where possible, each of said messages to a communications session according to the method of claim 1.

11. A disk including a computer-readable programmed memory including a computer program code to implement the method of claim 1.

12. A computer system having a disk including a computer-readable memory, wherein the computer-readable memory includes the computer program code of claim 1.

13. A method of identifying messages associated with a particular communications session in a stream of messages, which are captured from an interface within a UMTS-type network and comprise user data and network signalling data, the network including a fixed station in wireless communications with a plurality of mobile stations, said particular communications session being associated with one of said mobile stations and said stream of messages including messages for a plurality of communications sessions, the method comprising:

inputting a portion of said stream of messages;

reading network signalling data from said messages of said inputted stream, said signalling data including a plurality of network signalling parameters;

assigning a first session identifier to a message having a first one of said network signalling parameters, said at least one message being one of said messages of said inputted stream:

assigning said first session identifier to others of said messages also having said first one of said signalling parameters, said at least one message being one of said messages of said inputted stream;

linking second and third signalling parameters to said first signalling parameter, some of said messages including said first and second signalling parameters, others of said messages including said first and third signalling parameters;

identifying a said data communications session using said first session identifier; and outputting data identifying messages belonging to said identified communications session wherein said outputting includes outputting for said identified messages said first session identifier and said second and third parameters.

14. A disk including a computer-readable programmed memory including a computer program code to implement the method of claim 13.

15. A computer system having a disk including a computer-readable memory, wherein the disk including the computer-readable memory includes the computer program code of claim 14.

16. A disk including a processor-readable programmed memory containing processor executable control code to identify messages associated with a particular communications session in a stream of messages, which are captured from an interface within a network and comprise user data and network signalling data, the network including a fixed station in wireless communications with a plurality of mobile stations, said particular communications session being associated with one of said mobile stations and said stream of messages including messages for a plurality of communications sessions; the code comprising instructions which when performed by the processor cause the processor to, when operating:
 input a portion of said stream of messages;
 read network signalling data from said messages of said inputted stream, said signalling data including a plurality of network signalling parameters;
 assign a first session identifier to at least one message having a first one of said network signalling parameters, said at least one message being one of said messages of said inputted stream;
 assign a second session identifier to at least one message having a second one of said network signalling parameters, said at least one message being one of said messages of said inputted stream;
 identify a message having both said first and said second signalling parameters;
 use said identified message having both said first and second signalling parameters to link said at least one message having said first session identifier and said at least one message having said second session identifier to identify messages of said particular communications session; and
 identify said linked messages of said particular communications session by allocating a common identifier to the linked messages.

17. A computer system for identifying messages, which are associated with a particular communications session, in a stream of messages, which are captured from an interface within a network and comprise user data and network signalling data, the network including a fixed station in wireless communications with a plurality of mobile stations, said particular communications session being associated with one of said mobile stations and said stream of messages including messages for a plurality of communications sessions, the computer system comprising:
 an input to receive message data;
 data memory to store captured messages, associated decoded signalling parameter data, session identification data, and output data;
 program memory storing processor implementable instructions; and
 a processor coupled to said data memory and to said program memory to load and implement said instructions, said instructions comprising instructions for controlling the processor to:
input a portion of said stream of messages;
read network signalling data from said messages of said inputted stream, said signalling data including a plurality of network signalling parameters;
assign a first session identifier to at least one message having a first signalling parameter
assign a second session identifier to at least one message having a second signalling parameter identify a message having both said first and said second signalling parameters;
use said identified message having both said first and second signalling parameters to link said at least one message having said first session identifier and said at least one message having said second session identifier to identify messages of said particular communications session;
identify said linked messages of said particular communications session allocating a common identifier to the linked messages; and
output data identifying messages comprising at least part of said identified communications session.

* * * * *

UNITED STATES PATENT AND TRADEMARK OFFICE
CERTIFICATE OF CORRECTION

| | | |
|---|---|---|
| PATENT NO. | : 7,839,846 B2 | Page 1 of 1 |
| APPLICATION NO. | : 11/396260 | |
| DATED | : November 23, 2010 | |
| INVENTOR(S) | : Yiu Fai Ko | |

It is certified that error appears in the above-identified patent and that said Letters Patent is hereby corrected as shown below:

In column 24, line 24, in Claim 17, after "parameter" insert -- ; --.

In column 24, lines 25-28, in Claim 17,
delete "assign a second session identifier to at least one message having a second signalling parameter identify a message having both said first and said second signalling parameters;"
and
insert -- assign a second session identifier to at least one message having a second signalling parameter;
    identify a message having both said first and said second signalling parameters; --, therefor.

In column 24, line 37, in Claim 17, after "session" insert -- by --.

Signed and Sealed this
First Day of February, 2011

David J. Kappos
*Director of the United States Patent and Trademark Office*